(12) United States Patent
Wu et al.

(10) Patent No.: US 12,537,262 B2
(45) Date of Patent: Jan. 27, 2026

(54) BATTERY CELL, BATTERY, AND ELECTRIC DEVICE

(71) Applicant: CONTEMPORARY AMPEREX TECHNOLOGY CO., LIMITED, Ningde (CN)

(72) Inventors: Kai Wu, Ningde (CN); Xiaobo Chen, Ningde (CN); Sike Liu, Ningde (CN); Mingguang Gu, Ningde (CN); Jingfeng Bai, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/223,024

(22) Filed: May 30, 2025

(65) Prior Publication Data

US 2025/0293383 A1    Sep. 18, 2025

Related U.S. Application Data

(63) Continuation of application No. PCT/CN2023/103372, filed on Jun. 28, 2023.

(30) Foreign Application Priority Data

May 9, 2023 (CN) .......................... 202310513610.0

(51) Int. Cl.
*H01M 50/342* (2021.01)
*H01M 50/103* (2021.01)

(52) U.S. Cl.
CPC ...... *H01M 50/3425* (2021.01); *H01M 50/103* (2021.01); *H01M 2220/20* (2013.01); *Y02E 60/10* (2013.01)

(58) Field of Classification Search
CPC ......... H01M 50/3425; H01M 2220/20; H01M 50/103; Y02E 60/10
See application file for complete search history.

(56) References Cited

U.S. PATENT DOCUMENTS

2006/0105228 A1*  5/2006  Kim .................. H01M 10/0525
429/61

FOREIGN PATENT DOCUMENTS

| CN | 111933833 A | 11/2020 |
| CN | 215680848 U | 1/2022 |

(Continued)

OTHER PUBLICATIONS

The Grant Notice received in the counterpart CN application 202310513610.0, mailed on Jun. 8, 2023, 7 pages with English translation.

(Continued)

*Primary Examiner* — Lingwen R Zeng
(74) *Attorney, Agent, or Firm* — K&L Gates LLP

(57) ABSTRACT

A battery cell includes a casing with a wall portion having a weakened portion configured to rupture when internal pressure is released. The outer surface of the wall portion has a center point. A minimum distance between a projection of the weakened portion and the center point is defined as a, and a minimum radial dimension of the outer surface is defined as A, where a is greater than or equal to 0.3A. The weakened portion is positioned farther from the center and closer to the edge of the wall portion. The edge area has greater rigidity, deformation resistance, and fatigue resistance compared to the center. Placing the weakened portion near the edge reduces the likelihood of fatigue failure under gas pressure and helps prevent premature rupture, thereby improving pressure release reliability and maintaining normal battery cell operation.

15 Claims, 7 Drawing Sheets

(56) References Cited

FOREIGN PATENT DOCUMENTS

| | | |
|---|---|---|
| CN | 114175378 A | 3/2022 |
| CN | 215989098 U | 3/2022 |
| CN | 216720196 U | 6/2022 |
| CN | 217158533 U | 8/2022 |
| CN | 115210950 A | 10/2022 |
| CN | 217719870 U | 11/2022 |
| CN | 115663389 A | 1/2023 |
| CN | 218300006 U | 1/2023 |
| CN | 115832603 A | 3/2023 |
| CN | 116231221 A | 6/2023 |
| WO | 2023045672 A1 | 3/2023 |

OTHER PUBLICATIONS

The Grant Notice received in the counterpart CN application 202390000058.9, mailed on Mar. 14, 2024, 2 pages with English translation.
The international search report received in the counterpart PCT application PCT/CN2023/103372, mailed on Dec. 4, 2023, 7 pages with English translation.
The written opinion of ISA received in the counterpart PCT application PCT/CN2023/103372, mailed on Dec. 4, 2023, 10 pages with English translation.

\* cited by examiner

BATTERY CELL, BATTERY, AND ELECTRIC DEVICE

CROSS-REFERENCE TO RELATED APPLICATIONS

This application is a continuation of PCT Application No. PCT/CN2023/103372, filed on Jun. 28, 2023, which claims priority to Chinese Patent Application No. 2023105136100, filed on May 9, 2023, and entitled "BATTERY CELL, BATTERY, AND ELECTRIC DEVICE", which is incorporated herein by reference in its entirety.

TECHNICAL FIELD

This application relates to the field of batteries, and specifically, to a battery cell, a battery, and an electric device.

BACKGROUND

Batteries are widely applied in the field of new energy, such as electric vehicles and new energy vehicles, where new energy vehicles and electric vehicles have become a new trend in the development of the automotive industry. A battery is provided with a pressure relief mechanism configured to release internal pressure when the internal pressure of the battery reaches an activation pressure. However, the pressure relief mechanism often opens prematurely, resulting in failure to achieve normal pressure relief function.

SUMMARY

An objective of embodiments of this application is to provide a battery cell, a battery, and an electric device, aiming to address the issue in the related art where the pressure relief mechanism often opens prematurely, resulting in failure to achieve normal pressure relief function.

According to a first aspect, an embodiment of this application provides a battery cell, where the battery cell includes a casing, the casing has a wall portion, the wall portion includes a weakened portion, the weakened portion is configured to be ruptured when the battery cell releases internal pressure, and an outer surface of the wall portion has a center point. A minimum distance between a projection of the weakened portion on an outer surface of the wall portion and the center point is denoted as a, a minimum radial dimension of the outer surface of the wall portion is denoted as A, and the two satisfy: a≥0.3A, where the radial direction refers to a direction passing through the center point.

In the above technical solution, the minimum distance between the projection of the weakened portion on the outer surface of the wall portion and the center point is greater than or equal to 0.3 times the minimum radial dimension of the outer surface of the wall portion, such that the weakened portion is farther from the center point and closer to an edge of the wall portion. A position on the wall portion near the edge thereof, compared to a position near the center thereof, has greater rigidity, stronger resistance to deformation, and stronger fatigue resistance. Disposing the weakened portion at the position near the edge of the wall portion makes the weakened portion less prone to fatigue failure under gas pressure, which helps to reduce the risk of the weakened portion opening prematurely, enabling the battery cell to operate normally.

As an optional technical solution of the embodiments of this application, the wall portion includes a first region, the first region being a region within a preset distance b from an edge of the outer surface, and the weakened portion is disposed in the first region, satisfying: b=0.2A.

In the above technical solution, the first region is a region on the wall portion with relatively greater rigidity, offering stronger resistance to deformation and stronger fatigue resistance. Disposing the weakened portion in the first region makes the weakened portion less prone to fatigue failure under gas pressure, which helps to reduce the risk of the weakened portion opening prematurely, enabling the battery cell to operate normally.

As an optional technical solution of the embodiments of this application, the outer surface of the wall portion is square, the first region includes a long-side region, a short-side region, and a corner region, the long-side region extends along a length direction of the wall portion, the short-side region extends along a width direction of the wall portion, the corner region connects the long-side region and the short-side region, and the weakened portion is disposed in the corner region.

In the above technical solution, the fatigue resistance of the corner region is superior to those of the short-side region and the long-side region, and disposing the weakened portion in the corner region further reduces the risk of fatigue failure of the weakened portion.

As an optional technical solution of the embodiments of this application, the wall portion is provided with a score groove, and the weakened portion is formed at the bottom of the score groove.

In the above technical solution, forming the weakened portion by providing the score groove on the wall portion is simple, convenient, and cost-effective.

As an optional technical solution of the embodiments of this application, the weakened portion includes a first weakened segment and a second weakened segment, the first weakened segment is closer to the edge of the outer surface than the second weakened segment, and a thickness of the first weakened segment is less than a thickness of the second weakened segment.

In the above technical solution, during pressure relief of the battery cell, both the internal gas pressure of the battery cell and deformation of the wall portion affect the weakened portion, causing the weakened portion to rupture. The greater the internal gas pressure of the battery cell, the more easily the weakened portion is ruptured. The greater the deformation of the wall portion, the more easily the weakened portion is ruptured. The first weakened segment is closer to the edge of the outer surface than the second weakened segment, and since the internal gas pressure of the battery cell is the same, a degree of deformation of the wall portion at a position of the first weakened segment is less than a degree of deformation of the wall portion at a position of the second weakened segment; if the thickness of the first weakened segment is the same as the thickness of the second weakened segment, the first weakened segment is more difficult to rupture than the second weakened segment. By setting the thickness of the first weakened segment to be less than the thickness of the second weakened segment, when the internal pressure of the battery cell reaches the activation pressure, both the first weakened segment and the second weakened segment are easily ruptured, thereby facilitating pressure relief.

As an optional technical solution of the embodiments of this application, the weakened portion includes a third weakened segment, the first weakened segment and the second weakened segment are opposite each other and spaced apart, and the third weakened segment connects the first weakened segment and the second weakened segment.

In the above technical solution, during pressure relief of the battery cell, the weakened portion can open along the first weakened segment, the second weakened segment, and the third weakened segment, providing a larger pressure relief area, which helps to increase a pressure relief rate.

As an optional technical solution of the embodiments of this application, the third weakened segment intersects the first weakened segment at a first end, the third weakened segment intersects the second weakened segment at a second end, and along an extension direction of the third weakened segment, a thickness of the third weakened segment gradually increases from the first end toward the second end.

In the above technical solution, the first end is closer to the edge of the outer surface than the second end, and since the internal gas pressure of the battery cell is the same, a degree of deformation at a position on the third weakened segment near the first end is less than a degree of deformation at a position on the third weakened segment farther from the first end; if the thicknesses at all positions on the third weakened segment are the same, the position on the third weakened segment near the first end is more difficult to rupture than the position on the third weakened segment farther from the first end. By having the thickness of the third weakened segment gradually increase from the first end toward the second end, when the internal pressure of the battery cell reaches the activation pressure, all positions on the third weakened segment are easily ruptured, thereby facilitating pressure relief.

As an optional technical solution of the embodiments of this application, the weakened portion includes a fourth weakened segment, the fourth weakened segment is located between the first weakened segment and the second weakened segment and intersects the third weakened segment, a thickness of the fourth weakened segment is greater than the thickness of the first weakened segment, and the thickness of the fourth weakened segment is less than the thickness of the second weakened segment.

In the above technical solution, the first weakened segment is closer to the edge of the outer surface than the fourth weakened segment, and since the internal gas pressure of the battery cell is the same, a degree of deformation of the wall portion at a position of the first weakened segment is less than a degree of deformation of the wall portion at a position of the fourth weakened segment; if the thickness of the first weakened segment is the same as the thickness of the fourth weakened segment, the first weakened segment is more difficult to rupture than the fourth weakened segment. By setting the thickness of the first weakened segment to be less than the thickness of the fourth weakened segment, when the internal pressure of the battery cell reaches the activation pressure, both the first weakened segment and the fourth weakened segment are easily ruptured, thereby facilitating pressure relief. The fourth weakened segment is closer to the edge of the outer surface than the second weakened segment, and since the internal gas pressure of the battery cell is the same, a degree of deformation of the wall portion at a position of the fourth weakened segment is less than a degree of deformation of the wall portion at a position of the second weakened segment; if the thickness of the fourth weakened segment is the same as the thickness of the second weakened segment, the fourth weakened segment is more difficult to rupture than the second weakened segment. By setting the thickness of the fourth weakened segment to be less than the thickness of the second weakened segment, when the internal pressure of the battery cell reaches the activation pressure, both the fourth weakened segment and the second weakened segment are easily ruptured, thereby facilitating pressure relief.

As an optional technical solution of the embodiments of this application, the weakened portion includes a first weakened segment, the first weakened segment includes a third end and a fourth end opposite each other, the third end is closer to the edge of the outer surface than the fourth end, and a thickness of the third end is less than a thickness of the fourth end.

In the above technical solution, the third end is closer to the edge of the outer surface than the fourth end, and since the internal gas pressure of the battery cell is the same, a degree of deformation of the wall portion at a position of the third end is less than a degree of deformation of the wall portion at a position of the fourth end; if the thickness of the third end is the same as the thickness of the fourth end, the third end is more difficult to rupture than the fourth end. By setting the thickness of the third end to be less than the thickness of the fourth end, when the internal pressure of the battery cell reaches the activation pressure, both the third end and the fourth end are easily ruptured, thereby facilitating pressure relief.

As an optional technical solution of the embodiments of this application, along an extension direction of the first weakened segment, the thickness of the first weakened segment gradually increases from the third end toward the fourth end.

In the above technical solution, the third end is closer to the edge of the outer surface than the fourth end, and since the internal gas pressure of the battery cell is the same, a degree of deformation at a position on the first weakened segment near the third end is less than a degree of deformation at a position on the first weakened segment farther from the fourth end; if the thicknesses at all positions on the first weakened segment are the same, the position on the first weakened segment near the third end is more difficult to rupture than the position on the first weakened segment farther from the fourth end. By having the thickness of the first weakened segment gradually increase from the third end toward the fourth end, when the internal pressure of the battery cell reaches the activation pressure, all positions on the first weakened segment are easily ruptured, thereby facilitating pressure relief.

As an optional technical solution of the embodiments of this application, the weakened portion includes an arbitrary first weakened point and an arbitrary second weakened point, the first weakened point is closer to the edge of the outer surface than the second weakened point, and a thickness of the weakened portion at the first weakened point is less than a thickness of the weakened portion at the second weakened point.

In the above technical solution, the first weakened point is closer to the edge of the outer surface than the second weakened point, and since the internal gas pressure of the battery cell is the same, a degree of deformation of the wall portion at a position of the first weakened point is less than a degree of deformation of the wall portion at a position of the second weakened point; if the thickness at the first weakened point is the same as the thickness at the second weakened point, the first weakened point is more difficult to rupture than the second weakened point. By setting the thickness of the first weakened point to be less than the thickness of the second weakened point, when the internal pressure of the battery cell reaches the activation pressure, both the first weakened point and the second weakened point are easily ruptured, thereby facilitating pressure relief.

As an optional technical solution of the embodiments of this application, the casing includes a shell and an end cap, the shell has an opening, the end cap closes the opening, and the end cap and the shell are welded to form a weld mark portion; and along a thickness direction of the wall portion, a projection of the weakened portion does not overlap with a projection of the weld mark portion.

In the above technical solution, a position of the weld mark portion is relatively weak, and the weakened portion is offset from the weld mark portion, such that the weakened portion and the weld mark portion do not interfere with each other. The weakened portion is less likely to affect the strength of the weld mark portion, enabling stable connection between the end cap and the shell.

As an optional technical solution of the embodiments of this application, the wall portion includes a body portion, and the weakened portion is integrally formed with the body portion.

In the above technical solution, integrally forming the weakened portion with the body portion enhances rigidity of the weakened portion, thereby improving resistance of the weakened portion to creep and impact from an electrolyte, which helps to increase a lifespan of the weakened portion and reduce a risk of leakage at the weakened portion.

As an optional technical solution of the embodiments of this application, the wall portion includes a body portion and a pressure relief mechanism, the pressure relief mechanism and the body portion are separately arranged and connected, the weakened portion is disposed on the pressure relief mechanism, and an outer surface of the body portion is the outer surface of the wall portion.

In the above technical solution, separately arranging the pressure relief mechanism and the body portion and installing the pressure relief mechanism on the body portion facilitates manufacturing.

As an optional technical solution of the embodiments of this application, the casing includes a shell and an end cap, the shell has an opening; the end cap closes the opening; and the wall portion is the end cap or a wall of the shell.

In the above technical solution, the wall portion may be the end cap, a bottom wall of the shell, or a side wall of the shell. Disposing the weakened portion at the position near the edge of the end cap, the bottom wall, or the side wall makes it less prone to fatigue failure under gas pressure, which helps to reduce the risk of the weakened portion opening prematurely, enabling the battery cell to operate normally.

According to a second aspect, an embodiment of this application further provides a battery, where the battery includes the above-described battery cell.

According to a third aspect, an embodiment of this application further provides an electric device, where the electric device includes the above-described battery cell.

BRIEF DESCRIPTION OF DRAWINGS

To illustrate technical solutions of embodiments of this application more clearly, drawings required for use in the embodiments are briefly described below. It should be understood that the following drawings illustrate only certain embodiments of this application and therefore should not be regarded as limiting the scope. For those of ordinary skill in the art, other related drawings may be obtained based on these drawings without creative effort.

Figure 1:
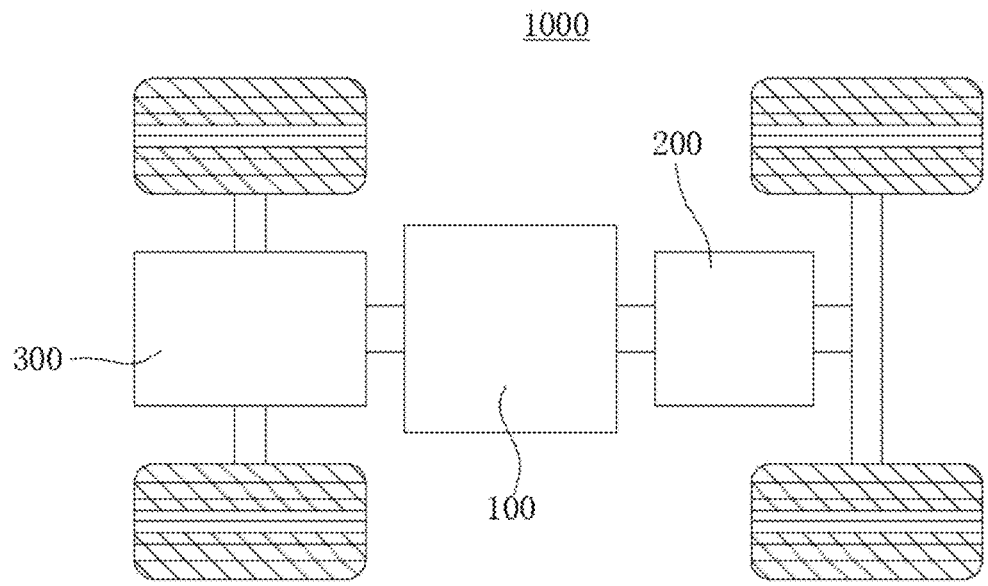
FIG. 1 is a schematic structural diagram of a vehicle according to some embodiments of this application.

Reference signs: 10—box; 11—first portion; 12—second portion; 20—battery cell; 21—weakened portion; 211—first weakened segment; 2111—third end; 2112—fourth end; 212—second weakened segment; 213—third weakened segment; 2131—first end; 2132—second end; 214—fourth weakened segment; 22—casing; 221—wall portion; 2211—first region; 22111—long-side region; 22112—short-side region; 22113—corner region; 2212—score groove; 2213—center point; 222—shell; 2221—side wall; 2222—bottom wall; 223—end cap; 224—weld mark portion; 23—electrode terminal; 100—battery; 200—controller; 300—motor; and 1000—vehicle.

DESCRIPTION OF EMBODIMENTS

To make the objectives, technical solutions, and advantages of embodiments of this application clearer, the technical solutions in the embodiments of this application are described clearly below with reference to the drawings in the embodiments of this application. Obviously, the described embodiments are part of the embodiments of this application, not all embodiments. Based on the embodiments in this application, all other embodiments obtained by those of ordinary skill in the art without creative effort fall within the protection scope of this application.

Unless otherwise defined, all technical and scientific terms used in this application have the same meanings as commonly understood by those skilled in the technical field to which this application pertains; terms used in the specification of this application are solely for the purpose of describing specific embodiments and are not intended to limit this application; the terms "include" and "have" and any variations thereof in the specification, claims, and the above description of drawings of this application are intended to cover non-exclusive inclusion. In the specification, claims, or accompanying drawings of this application, the terms "first", "second", and the like are intended to distinguish between different objects rather than to describe a particular order or a primary-secondary relationship.

Reference to "embodiment" in this application means that a specific feature, structure, or characteristic described in connection with the embodiment may be included in at least one embodiment of this application. The appearance of this phrase in various places in the specification does not necessarily refer to the same embodiment, nor is it an independent or alternative embodiment mutually exclusive with other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection; and a direct connection, an indirect connection via an intermediate medium, or an internal communication between two elements. For those of ordinary skill in the art, the specific meanings of the above terms in this application can be understood based on specific circumstances.

The term "and/or" in this application is merely an association relationship describing associated objects, indicating that three relationships may exist. For example, A and/or B may indicate: A exists alone, A and B exist simultaneously, and B exists alone. In addition, the character "/" in this application generally indicates an "or" relationship between the contextually associated objects.

In the embodiments of this application, the same reference signs denote the same components. For brevity, in different embodiments, detailed descriptions of the same components are not repeated. It should be understood that the thickness, length, width, and other dimensions of various components in the embodiments of this application shown in the drawings, as well as the overall thickness, length, width, and other dimensions of an integrated device, are for illustrative purposes only and should not constitute any limitation to this application.

The term "a plurality of" appearing in this application refers to two or more (including two).

In this application, a battery cell may include a lithium-ion secondary battery, a lithium-ion primary battery, a lithium-sulfur battery, a sodium-lithium-ion battery, a sodium-ion battery, or a magnesium-ion battery, and the embodiments of this application are not limited thereto. The battery cell may be in the shape of a cylinder, a flat body, a cuboid, or other shapes, and the embodiments of this application are not limited thereto. Battery cells are generally categorized into three types based on packaging methods: cylindrical battery cells, prismatic battery cells, and pouch battery cells, and the embodiments of this application are not limited thereto.

The battery mentioned in the embodiments of this application refers to a single physical module including one or more battery cells to provide higher voltage and capacity. For example, the battery mentioned in this application may include a battery module, a battery pack, or the like. The battery generally includes a box configured to encapsulate one or more battery cells. The box can prevent liquids or other foreign objects from affecting charging or discharging of the battery cells to a certain extent.

The battery cell includes an electrode assembly and an electrolyte. The electrode assembly includes a positive electrode plate, a negative electrode plate, and a separator. The battery cell operates primarily by the movement of metal ions between the positive electrode plate and the negative electrode plate. The positive electrode plate includes a positive electrode current collector and a positive electrode active material layer, the positive electrode active material layer is applied to a surface of the positive electrode current collector, and a portion of the positive electrode current collector not coated with the positive electrode active material layer protrudes from the positive electrode current collector coated with the positive electrode active material layer, the portion of the positive electrode current collector not coated with the positive electrode active material layer serving as a positive tab. Taking a lithium-ion battery as an example, a material of the positive electrode current collector may be aluminum, and the positive electrode active material may be lithium cobalt oxide, lithium iron phosphate, ternary lithium, or lithium manganese oxide. The negative electrode plate includes a negative electrode current collector and a negative electrode active material layer, the negative electrode active material layer is applied to a surface of the negative electrode current collector, and a portion of the negative electrode current collector not coated with the negative electrode active material layer protrudes from the negative electrode current collector coated with the negative electrode active material layer, the portion of the negative electrode current collector not coated with the negative electrode active material layer serving as a negative tab. A material of the negative electrode current collector may be copper, and the negative electrode active material may be carbon or silicon. To ensure passage of a large current without fusing to a certain extent, multiple positive tabs are provided and stacked together, and multiple negative tabs are provided and stacked together. The separator may be made of PP (polypropylene, polypropylene), PE (polyethylene, polyethylene), or the like. In addition, the electrode assembly may have a wound structure or a stacked structure, and the embodiments of this application are not limited thereto.

The development of battery technology must consider multiple design factors simultaneously, such as energy density, cycle life, discharge capacity, charge-discharge rate, and other performance parameters, while also considering reliability of the battery.

For a battery cell, to ensure reliability of the battery cell, a pressure relief mechanism may be provided on a casing of the battery cell, for example, a weakened portion is provided on an end cap, and when an internal pressure of the battery cell reaches an activation pressure, the weakened portion is ruptured to release the internal pressure of the battery cell, reducing risks of explosion and fire of the battery cell. However, the weakened portion often opens prematurely, resulting in failure to achieve normal pressure relief function.

During use of the battery cell, gas is generated inside the battery cell, and the battery cell undergoes a breathing effect. The breathing effect causes repeated deformation of the wall portion. Since the weakened portion is disposed on the wall portion, the weakened portion also deforms along with the deformation of the wall portion. After a period of time, the weakened portion is prone to fatigue failure, leading to premature opening and failure to achieve normal pressure relief function.

In view of this, an embodiment of this application provides a battery cell, where the battery cell includes a casing, and the casing has a wall portion. The wall portion includes a weakened portion, and the weakened portion is configured to be ruptured when the battery cell releases internal pressure. An outer surface of the wall portion has a center point. A minimum distance between a projection of the weakened portion on an outer surface of the wall portion and the center point is denoted as a, a minimum radial dimension of the outer surface of the wall portion is denoted as A, and the two satisfy: $a \geq 0.3A$.

The minimum distance between the projection of the weakened portion on the outer surface of the wall portion and the center point is greater than or equal to 0.3 times the minimum radial dimension of the outer surface of the wall portion, such that the weakened portion is farther from the center point and closer to an edge of the wall portion. A position on the wall portion near the edge thereof, compared to a position near the center thereof, has greater rigidity, stronger resistance to deformation, and stronger fatigue resistance. Disposing the weakened portion at the position near the edge of the wall portion makes it less prone to fatigue failure under gas pressure, which helps to reduce the risk of the weakened portion opening prematurely, enabling the battery cell to operate normally.

The technical solutions described in the embodiments of this application are applicable to batteries and electric devices using batteries.

The electric device may be a vehicle, a mobile phone, a portable device, a notebook computer, a ship, a spacecraft, an electric toy, an electric tool, or the like. The spacecraft includes an airplane, a rocket, a space shuttle, a spaceship, or the like; the electric toy includes a fixed or mobile electric toy, such as a game console, an electric car toy, an electric ship toy, an electric airplane toy, or the like; the electric tool includes a metal cutting electric tool, a grinding electric tool, an assembly electric tool, or a railway electric tool, such as an electric drill, an electric grinder, an electric wrench, an electric screwdriver, an electric hammer, an impact drill, a concrete vibrator, an electric planer, or the like.

For ease of description, an example in which the electric device is a vehicle 1000 is used for description in the following embodiments.

Referring to FIG. 1, FIG. 1 is a schematic structural diagram of the vehicle 1000 according to some embodiments of this application. The vehicle 1000 may be a fuel vehicle, a gas vehicle, or a new energy vehicle, and the new energy vehicle may be a battery electric vehicle, a hybrid electric vehicle, or an extended-range vehicle. The vehicle 1000 is provided with a battery 100 inside, and the battery 100 may be disposed at the bottom, front, or rear of the vehicle 1000. The battery 100 may be used for power supply of the vehicle 1000, for example, the battery 100 may serve as an operational power source of the vehicle 1000. The vehicle 1000 may further include a controller 200 and a motor 300, where the controller 200 is configured to control the battery 100 to supply power to the motor 300, for example, for operational power demands during starting, navigation, and driving of the vehicle 1000.

In some embodiments of this application, the battery 100 may be used as not only the operational power source for the vehicle 1000 but also a driving power source for the vehicle 1000, replacing or partially replacing fossil fuel or natural gas to provide driving traction for the vehicle 1000.

Figure 2:
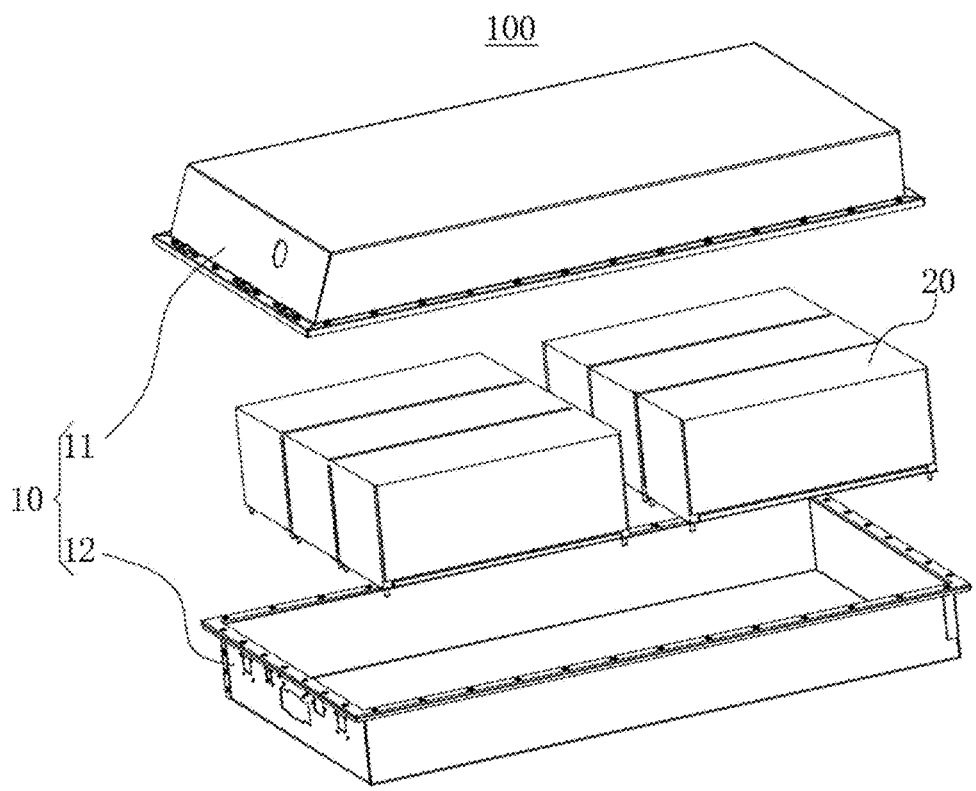
FIG. 2 is an exploded view of a battery according to some embodiments of this application.

Referring to FIG. 2, FIG. 2 is an exploded view of the battery 100 according to some embodiments of this application. The battery 100 includes a box 10 and a battery cell 20, where the battery cell 20 is accommodated in the box 10. The box 10 is configured to provide an accommodating space for the battery cell 20. The box 10 may have various structures. In some embodiments, the box 10 may include a first portion 11 and a second portion 12, the first portion 11 and the second portion 12 cover each other, and the first portion 11 and the second portion 12 jointly define the accommodating space for accommodating the battery cell 20. The second portion 12 may be a hollow structure with an opening at one end, the first portion 11 may be a plate-like structure, and the first portion 11 covers an opening side of the second portion 12, such that the first portion 11 and the second portion 12 jointly define the accommodating space; the first portion 11 and the second portion 12 may also each be a hollow structure with an opening on one side, and an opening side of the first portion 11 covers an opening side of the second portion 12. Certainly, the box 10 formed by the first portion 11 and the second portion 12 may have various shapes, such as a cylinder, or a cuboid.

In the battery 100, the battery cell 20 is present in plurality, and the plurality of battery cells 20 may be connected in series, parallel, or series-parallel, where being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 10. Certainly, the battery 100 may alternatively be formed in a manner that a plurality of battery cells 20 are connected in series, parallel, or series-parallel first to form a battery module and then a plurality of battery modules are connected in series, parallel, or series-parallel to form an entirety which is accommodated in the box 10. The battery 100 may further include other structures. For example, the battery 100 may further include a busbar configured to implement electrical connection between the plurality of battery cells 20.

Each battery cell 20 may be a secondary battery cell or a primary battery cell; or may be a lithium-sulfur battery cell, a sodium-ion battery cell, or a magnesium-ion battery cell, but is not limited thereto. The battery cell 20 may be in the shape of a cylinder, a flat body, a cuboid, or other shapes.

Figure 3:
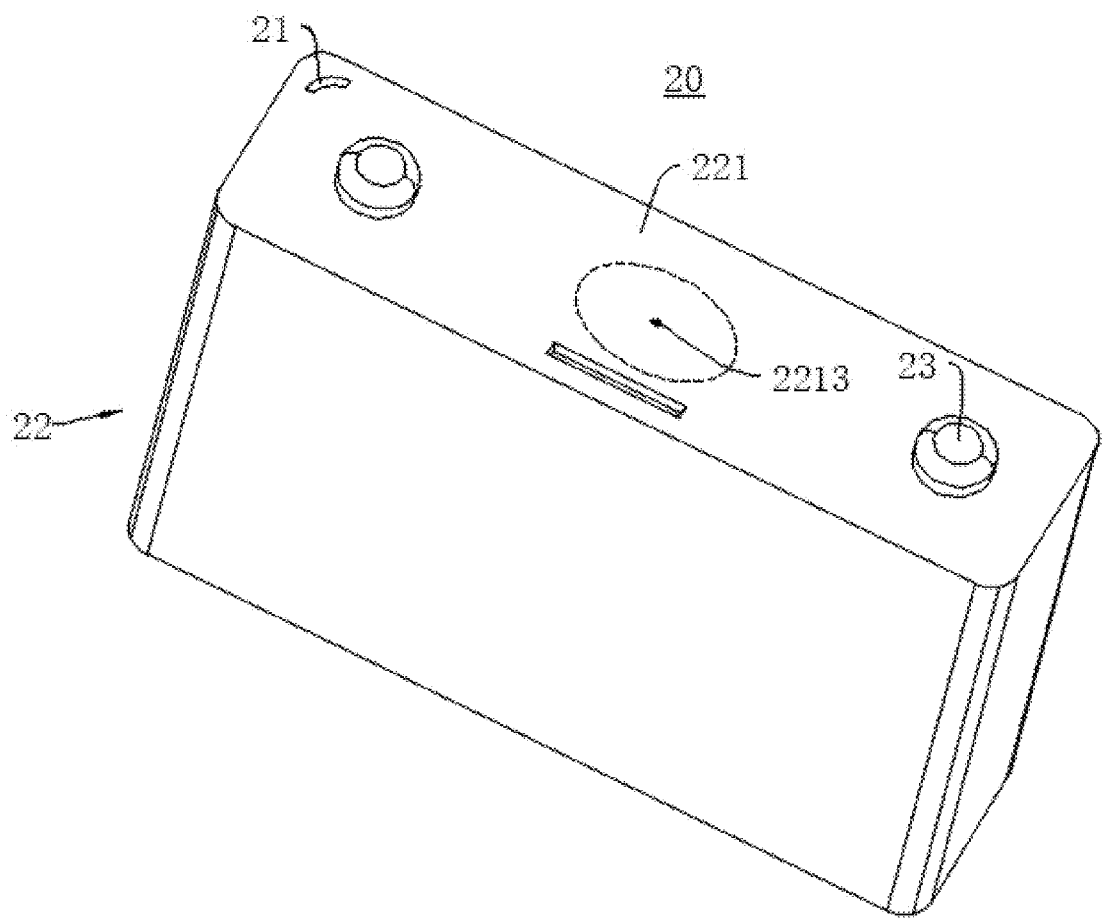
FIG. 3 is a schematic structural diagram of a battery cell according to some embodiments of this application.
Figure 4:
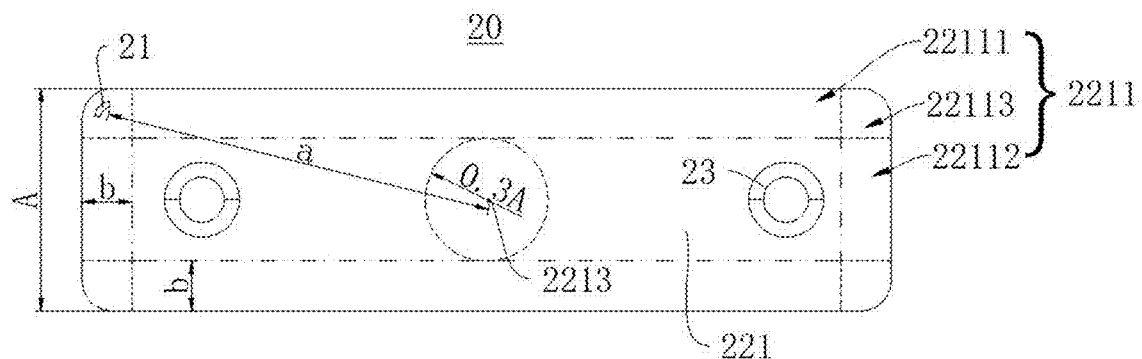
FIG. 4 is a schematic top view of a battery cell according to some embodiments of this application.
Figure 5:
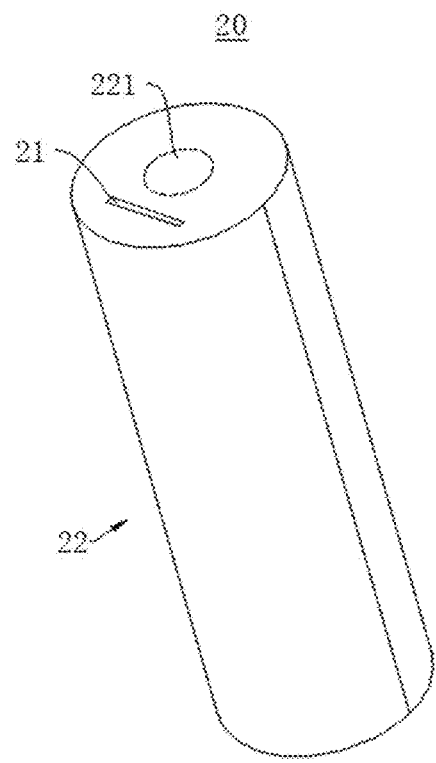
FIG. 5 is a schematic structural diagram of a battery cell according to some other embodiments of this application.
Figure 6:
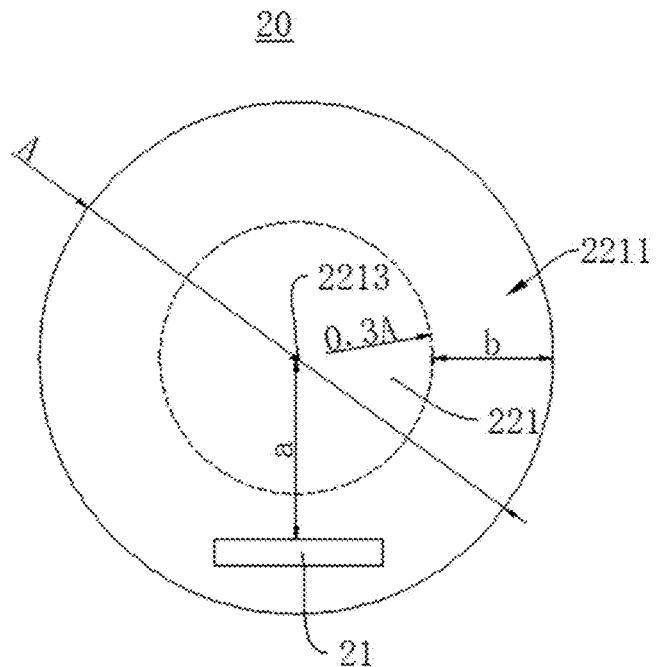
FIG. 6 is a schematic top view of a battery cell according to some other embodiments of this application.

Referring to FIG. 3, FIG. 4, FIG. 5, and FIG. 6, FIG. 3 is a schematic structural diagram of the battery cell 20 according to some embodiments of this application. FIG. 4 is a schematic top view of the battery cell 20 according to some embodiments of this application. FIG. 5 is a schematic structural diagram of the battery cell 20 according to some other embodiments of this application. FIG. 6 is a schematic top view of the battery cell 20 according to some other embodiments of this application. An embodiment of this application provides a battery cell 20, where the battery cell 20 includes a casing 22, and the casing 22 has a wall portion 221. The wall portion 221 includes a weakened portion 21, the weakened portion 21 is configured to be ruptured when the battery cell 20 releases internal pressure, and an outer surface of the wall portion 221 has a center point 2213. A minimum distance between a projection of the weakened portion 21 on an outer surface of the wall portion 221 and the center point 2213 is denoted as a, a minimum radial dimension of the outer surface of the wall portion 221 is denoted as A, and the two satisfy: $a \geq 0.3A$. The radial direction refers to a direction passing through the center point 2213.

The battery cell 20 refers to a smallest unit constituting the battery 100.

The casing 22 includes an end cap 223 and a shell 222, the shell 222 has an accommodating space with an opening at one end, and the accommodating space is configured to accommodate an electrode assembly. The end cap 223 is connected to the shell 222 and closes the opening.

The end cap 223 refers to a component that covers an opening of the shell 222 to isolate an internal environment of the battery cell 20 from an external environment. A shape of the end cap 223 is not limited and may be adapted to a shape of the shell 222 to fit the shell 222. Optionally, the end cap 223 may be made of a material with specified hardness and strength (for example, aluminum alloy), so that the end cap 223 is less likely to deform when subjected to extrusion and collision, allowing the battery cell 20 to have higher structural strength and enhanced reliability. A material of the end cap 223 may also be various, such as copper, iron, aluminum, stainless steel, aluminum alloy, or plastic. In some embodiments, the battery cell 20 further includes an insulating member, the insulating member is disposed on an inner side of the end cap 223, and the insulating member may be configured to isolate electrical connection components within the shell 222 from the end cap 223 to reduce a risk of short circuit. For example, the insulating member may be plastic, rubber, or the like.

The shell 222 is a component configured to cooperate with the end cap 223 to form an internal environment of the battery cell 20, where the formed internal environment may be configured to accommodate the electrode assembly, electrolyte, and other components. The shell 222 and the end cap 223 may be independent components, an opening may be provided on the shell 222, and the end cap 223 covers the opening to form the internal environment of the battery cell 20. Without limitation, the end cap 223 and the shell 222 may also be integrated; specifically, the end cap 223 and the shell 222 may form a common joint surface before other components are placed into the shell, and when the shell 222 needs to be encapsulated, the end cap 223 is made to cover the shell 222. The shell 222 may have various shapes and sizes, such as a cuboid shape, a cylindrical shape, or a hexagonal prism shape. Specifically, a shape of the shell 222 may be determined based on a specific shape and size of the electrode assembly. A material of the shell 222 may be various, such as copper, iron, aluminum, stainless steel, aluminum alloy, or plastic.

The electrode assembly is a component in the battery cell 20 where an electrochemical reaction occurs. The casing 22 may contain one or more electrode assemblies. The electrode assembly is primarily formed by winding or stacking a positive electrode plate and a negative electrode plate, and a separator is typically provided between the positive electrode plate and the negative electrode plate. Portions of the positive electrode plate and the negative electrode plate with active materials constitute a body portion of the electrode assembly, while portions of the positive electrode plate and the negative electrode plate without active materials each constitute a tab. A positive tab and a negative tab may both be located at one end of the body portion or be located at two ends of the body portion respectively. During charging and discharging of the battery 100, a positive electrode active material and a negative electrode active material react with the electrolyte.

The casing 22 may be provided with an electrode terminal 23, and the electrode terminal 23 may be configured to be electrically connected to the electrode assembly for outputting or inputting electrical energy of the battery cell 20. The electrode terminal 23 may be disposed on the end cap 223 or may be disposed on the shell 222. In the embodiment shown in FIG. 3, the electrode terminal 23 is disposed on the end cap 223.

The weakened portion 21 is a structure configured to open when the internal pressure or temperature of the battery cell 20 reaches an activation pressure to release the internal pressure of the battery cell 20, reducing risks of explosion and fire of the battery cell 20.

The casing 22 has a plurality of walls, such as a bottom wall 2222 or a side wall 2221. Each wall on the casing 22 may serve as the wall portion 221. For example, the bottom wall 2222 may be the wall portion 221, and in this case, the weakened portion 21 is disposed on the bottom wall 2222. As another example, the side wall 2221 may be the wall portion 221, and in this case, the weakened portion 21 is disposed on the side wall 2221. Specifically, the end cap 223 may individually serve as the wall portion 221, and in this case, the weakened portion 21 is disposed on the end cap 223. It should be noted that the casing 22 may have a plurality of wall portions 221, and in this case, each wall portion 221 is provided with the weakened portion 21. For example, both the bottom wall 2222 and the side wall 2221 are wall portions 221, and in this case, both the bottom wall 2222 and the side wall 2221 are provided with the weakened portion 21.

The outer surface of the wall portion 221 has a center point 2213. Referring to FIG. 3 and FIG. 4, taking the wall portion 221 as a rectangular structure as an example, the center point 2213 of the outer surface of the wall portion 221 is an intersection of diagonals of the rectangle. Referring to FIG. 5 and FIG. 6, taking the wall portion 221 as a circular structure as an example, the center point 2213 of the outer surface of the wall portion 221 is a center of the circle.

a denotes the minimum distance between the projection of the weakened portion 21 on the outer surface of the wall portion 221 and the center point 2213, that is, a distance between a point on the projection of the weakened portion 21 on the outer surface of the wall portion 221 closest to the center point 2213 and the center point 2213. For example, the weakened portion 21 is circular, and a center of the circle overlaps with the center point 2213; in this case, the minimum distance between the projection of the weakened portion 21 on the outer surface of the wall portion 221 and the center point 2213 is a radius of the circle corresponding to the weakened portion 21. As another example, the weakened portion 21 is elongated, and an extension direction of the elongated weakened portion 21 passes through the center point 2213. In this case, the minimum distance between the projection of the weakened portion 21 on the outer surface of the wall portion 221 and the center point 2213 is a distance between an end of the weakened portion 21 closest to the center point 2213 and the center point 2213.

A denotes the minimum radial dimension of the outer surface of the wall portion 221. "The minimum radial dimension of the outer surface of the wall portion 221" refers to a dimension of a shortest straight line segment among a plurality of straight line segments that have any two points on an edge of the wall portion 221 as endpoints and pass through the center point 2213. Referring to FIG. 3 and FIG. 4, in the embodiments shown in FIG. 3 and FIG. 4, the outer surface of the wall portion 221 is rectangular, and the minimum radial dimension of the outer surface of the wall portion 221 is a width of the rectangle. Referring to FIG. 5 and FIG. 6, in the embodiments shown in FIG. 5 and FIG. 6, the outer surface of the wall portion 221 is circular, and the minimum radial dimension of the outer surface of the wall portion 221 is a diameter of the circle. As another example, in some embodiments, the outer surface of the wall portion 221 is a regular hexagon, and the minimum radial dimension of the outer surface of the wall portion 221 is a distance between two parallel sides of the regular hexagon.

"The minimum distance between the projection of the weakened portion 21 on the outer surface of the wall portion 221 and the center point 2213 is denoted as a, the minimum radial dimension of the outer surface of the wall portion 221 is denoted as A, and the two satisfy: a≥0.3A" can be understood as: the weakened portion 21 is located outside a circular region on the wall portion 221, an edge of the weakened portion 21 may overlap with an edge of the circular region, but cannot be within the circular region. The circular region has the center point 2213 of the outer surface of the wall portion 221 as a center and 0.3 times the minimum radial dimension of the outer surface of the wall portion 221 as a radius. The circular region is a region on the wall portion 221 near a center of the wall portion 221. A region outside the circular region is a region on the wall portion 221 near an edge of the wall portion 221. Compared to the circular region, a region outside the circular region on the wall portion 221 has greater rigidity, stronger resistance to deformation, and stronger fatigue resistance.

Referring to FIG. 3, FIG. 4, FIG. 5, and FIG. 6, in FIG. 3, FIG. 4, FIG. 5, and FIG. 6, a range of the circular region is shown with a dashed line. It should be noted that the dashed line is only used to indicate a boundary of the circular region and does not represent other physical structures obscured at that position.

The minimum distance between the projection of the weakened portion 21 on the outer surface of the wall portion 221 and the center point 2213 is greater than or equal to 0.3 times the minimum radial dimension of the outer surface of the wall portion 221, such that the weakened portion 21 is farther from the center point 2213 and closer to the edge of the wall portion 221. A position on the wall portion 221 near the edge thereof, compared to a position near the center thereof, has greater rigidity, stronger resistance to deformation, and stronger fatigue resistance. Disposing the weakened portion 21 at the position near the edge of the wall portion 221 makes it less prone to fatigue failure under gas pressure, which helps to reduce the risk of the weakened portion 21 opening prematurely, enabling the battery cell 20 to operate normally.

Referring to FIG. 3, FIG. 4, FIG. 5, and FIG. 6, in some embodiments, the wall portion 221 includes a first region 2211, the first region 2211 being a region within a preset distance b from an edge of the outer surface. The weakened portion 21 is disposed in the first region 2211. b=0.2A is satisfied.

The first region 2211 is a region on the wall portion 221 near the edge of the wall portion 221. A region on the wall portion 221 near the center of the wall portion 221 has less rigidity, and when subjected to gas pressure, the region near the center of the wall portion 221 experiences greater deformation and has weaker fatigue resistance. The first region 2211, compared to the region near the center of the wall portion 221, has greater rigidity, and when subjected to gas pressure, the first region 2211 experiences relatively less deformation and has stronger fatigue resistance.

Referring to FIG. 3 and FIG. 4, in FIG. 3 and FIG. 4, a boundary of the first region 2211 is shown with a double-dotted line, and the first region 2211 is a region enclosed by the double-dotted line and the edge of the wall portion 221. It should be noted that the double-dotted line is only used to indicate the boundary of the first region 2211 and does not represent other meanings.

Referring to FIG. 3 and FIG. 4, the wall portion 221 is rectangular, a distance between a long side of the double-dotted line and an edge of a long side of the wall portion 221 is b, a distance between a short side of the double-dotted line and an edge of a short side of the wall portion 221 is b, and the first region 2211 may be a region shaped as a rectangular frame.

It should be noted that if a corner of the wall portion 221 adopts a rounded transition, the long side and the short side of the double-dotted line may not adopt a rounded transition, but rather the long side and the short side directly intersect to form a corner.

Referring to FIG. 5 and FIG. 6, the wall portion 221 is circular. The first region 2211 is a region enclosed by a dashed line and the edge of the wall portion 221. The dashed line indicates both an edge of the first region 2211 and an edge of the circular region.

The first region 2211 is specifically a region within the preset distance b from an edge of the outer surface, and the minimum radial dimension of the outer surface of the wall portion 221 is A, then b=0.2A.

"The weakened portion 21 is disposed in the first region 2211" means that the weakened portion 21 is entirely located within the first region 2211, an edge of the weakened portion 21 may overlap with an edge of the first region 2211, but cannot extend beyond the first region 2211.

The closer a position on the wall portion 221 is to the center thereof, the less the rigidity. The first region 2211 is a region on the wall portion 221 with relatively greater rigidity, offering stronger resistance to deformation and stronger fatigue resistance. Positioning the weakened portion 21 in the first region 2211 makes the weakened portion less prone to fatigue failure under gas pressure, which helps to reduce the risk of the weakened portion 21 opening prematurely, enabling the battery cell 20 to operate normally.

Referring to Table 1, Table 1 shows an average fatigue life of the weakened portion 21 in regions of different rigidity on the wall portion 221. The fatigue life is defined as: a number of charge-discharge cycles at which a macroscopic crack first appears in the weakened portion 21 of the battery cell 20 under cyclic charging and discharging. The average fatigue life is an average value of multiple fatigue lives obtained from multiple fatigue life tests conducted by gradiently selecting distances between the weakened portion 21 and the edge of the wall portion 221 within the same rigidity region. The rigidity region is a region within a preset distance b from the edge of the wall portion 221, and the weakened portion 21 is disposed in the rigidity region, where the minimum radial dimension of the outer surface of the wall portion 221 is A, satisfying: b=xA, where x is a coefficient, and depending on different values of x, a size of the rigidity region varies.

This test uses an 87203 prismatic battery cell with a capacity of 298 Ah, dimensions of the battery cell 20 being: 87 mm×203 mm×112 mm, adopting a Ni50 system, with a full charge voltage of 4.35 V and a full discharge voltage of 2.5 V. A specific testing method is as follows:

Full charge: The cell is fully charged to 4.35 V at a constant current of 98 A, and left standing for five minutes.

Full discharge: The cell is fully charged to 2.5 V at a constant current of 98 A, and left standing for five minutes to complete one charge-discharge cycle.

When a macroscopic crack first appears in the weakened portion 21, observation can be made with the naked eye or through an industrial camera.

TABLE 1

| Test No. | x | Average fatigue life (unit: cycles) |
| --- | --- | --- |
| Test 1 | 0.4 | 500 |
| Test 2 | 0.35 | 567 |
| Test 3 | 0.3 | 583 |
| Test 4 | 0.25 | 655 |
| Test 5 | 0.2 | 1160 |
| Test 6 | 0.175 | 1184 |
| Test 7 | 0.15 | 1213 |
| Test 8 | 0.125 | 1433 |
| Test 9 | 0.1 | 1470 |
| Test 10 | 0.075 | 1527 |
| Test 11 | 0.5 | 1595 |
| Test 12 | 0.025 | 1628 |

Referring to Table 1, as can be seen from the table, the smaller the value of x, the greater the average fatigue life of the weakened portion 21, and the less likely the weakened portion 21 is to experience fatigue failure. When x>0.2, the average fatigue life of the weakened portion 21 is less than 1000 cycles, indicating poor fatigue failure resistance. When x≤0.2, the average fatigue life of the weakened portion 21 is greater than 1000 cycles, indicating good fatigue failure resistance. Therefore, in the embodiments of this application, the rigidity region is designated as the first region 2211 when x=0.2, and disposing the weakened portion 21 within the first region 2211 makes the weakened portion 21 less prone to fatigue failure under gas pressure, which helps to reduce the risk of the weakened portion 21 opening prematurely, enabling the battery cell 20 to operate normally.

Referring to FIG. 3 and FIG. 4, in some embodiments, the outer surface of the wall portion 221 is square. The first region 2211 includes a long-side region 22111, a short-side region 22112, and a corner region 22113, the long-side region 22111 extends along a length direction of the wall portion 221, the short-side region 22112 extends along a width direction of the wall portion 221, and the corner region 22113 connects the long-side region 22111 and the short-side region 22112. The weakened portion 21 is disposed in the corner region 22113.

In FIG. 4, boundaries of the long-side region 22111, the short-side region 22112, and the corner region 22113 are shown with a dotted line. Similarly, the dotted line is only used to indicate the boundaries of the long-side region 22111, the short-side region 22112, and the corner region 22113, and does not represent a physical structure.

The long-side region 22111 is a region extending along the length direction of the wall portion 221, and a long side of the long-side region 22111 is parallel to the length direction of the wall portion 221. The long-side region 22111 is located near a long side of the wall portion 221. Referring to FIG. 4, in the embodiments shown in FIG. 4, the first region 2211 has two long-side regions 22111, and the two long-side regions 22111 are spaced apart along the width direction of the wall portion 221.

The short-side region 22112 is a region extending along the width direction of the wall portion 221, and a long side of the short-side region 22112 is parallel to the width direction of the wall portion 221. The short-side region 22112 is located near a short side of the wall portion 221. Referring to FIG. 4, in the embodiments shown in FIG. 4, the first region 2211 has two short-side regions 22112, and the two short-side regions 22112 are spaced apart along the length direction of the wall portion 221.

The corner region 22113 is a region connected between the long-side region 22111 and the short-side region 22112. The short-side region 22112 is located near a corner position of the wall portion 221. Referring to FIG. 4, in the embodiments shown in FIG. 4, the first region 2211 has four corner regions 22113.

A length of the long-side region 22111 is greater than a length of the short-side region 22112. An area of the long-side region 22111 is greater than an area of the short-side region 22112, and the area of the short-side region 22112 is greater than an area of the corner region 22113. Generally, fatigue resistance of the short-side region 22112 is slightly stronger than fatigue resistance of the long-side region 22111, and fatigue resistance of the corner region 22113 is slightly stronger than fatigue resistance of the short-side region 22112.

The fatigue resistance of the corner region 22113 is superior to those of the short-side region 22112 and the long-side region 22111, and disposing the weakened portion 21 in the corner region 22113 further reduces the risk of fatigue failure of the weakened portion 21.

Figure 7:
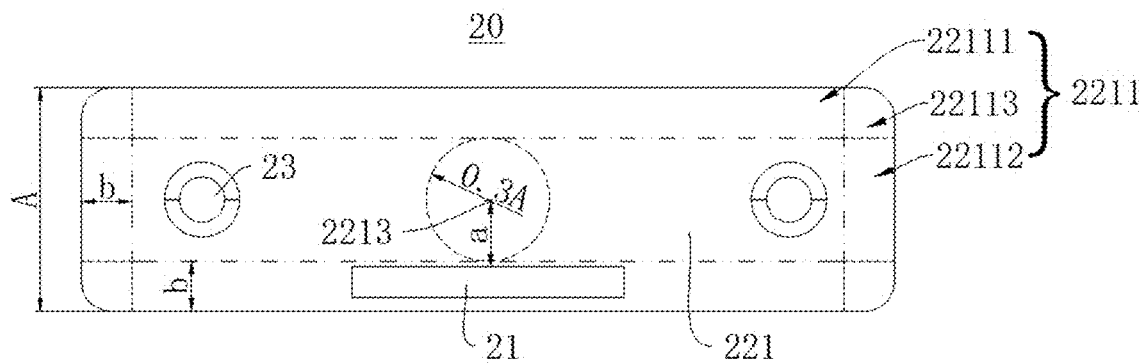
FIG. 7 is a schematic top view of a battery cell (with a weakened portion disposed in a long-side region) according to some embodiments of this application.

Referring to FIG. 7, FIG. 7 is a schematic top view of the battery cell 20 (with the weakened portion 21 disposed in the long-side region 22111) according to some embodiments of this application. In some embodiments, the weakened portion 21 is disposed in the long-side region 22111.

The area of the long-side region 22111 is greater than the area of the short-side region 22112, and the area of the short-side region 22112 is greater than the area of the corner region 22113. By disposing the weakened portion 21 in the long-side region 22111, an area of the weakened portion 21 can be made larger, enabling the weakened portion 21 to have a larger opening during pressure relief to facilitate rapid pressure relief.

Referring to FIG. 7, in some embodiments, a length direction of the weakened portion 21 is consistent with an extension direction of the long-side region 22111.

The extension direction of the long-side region 22111 is the length direction of the wall portion 221. "The length direction of the weakened portion 21 is consistent with the extension direction of the long-side region 22111" can also be understood as the length direction of the weakened portion 21 being consistent with the length direction of the wall portion 221.

By making the length direction of the weakened portion 21 consistent with the extension direction of the long-side region 22111, the area of the weakened portion 21 can be made larger, facilitating rapid pressure relief of the battery cell 20.

Figure 8:
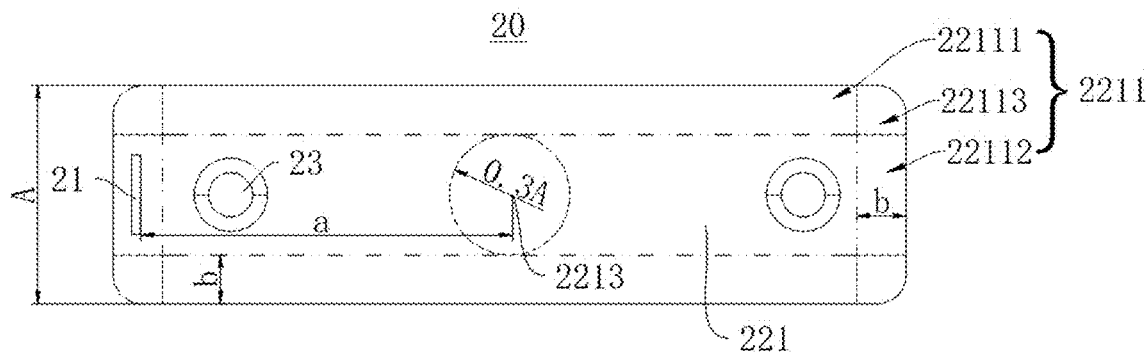
FIG. 8 is a schematic top view of a battery cell (with a weakened portion disposed in a short-side region) according to some embodiments of this application.

Referring to FIG. 8, FIG. 8 is a schematic top view of the battery cell 20 (with the weakened portion 21 disposed in the short-side region 22112) according to some embodiments of this application. In some embodiments, the weakened portion 21 is disposed in the short-side region 22112.

The fatigue resistance of the short-side region 22112 is better than the fatigue resistance of the long-side region 22111, and by disposing the weakened portion 21 in the short-side region 22112, the weakened portion 21 can have better fatigue resistance, which helps to reduce the risk of the weakened portion 21 opening prematurely. Additionally, the area of the weakened portion 21 can be made relatively large, enabling the weakened portion 21 to have a larger opening during pressure relief to facilitate rapid pressure relief. In short, disposing the weakened portion 21 in the short-side region 22112 balances both fatigue resistance and pressure relief area.

In some embodiments, a length direction of the weakened portion 21 is consistent with an extension direction of the short-side region 22112.

The extension direction of the short-side region 22112 is the width direction of the wall portion 221. "The length direction of the weakened portion 21 is consistent with the extension direction of the short-side region 22112" can also be understood as the length direction of the weakened portion 21 being consistent with the width direction of the wall portion 221.

By making the length direction of the weakened portion 21 consistent with the extension direction of the short-side region 22112, the area of the weakened portion 21 can be made larger, facilitating rapid pressure relief of the battery cell 20.

Figure 9:
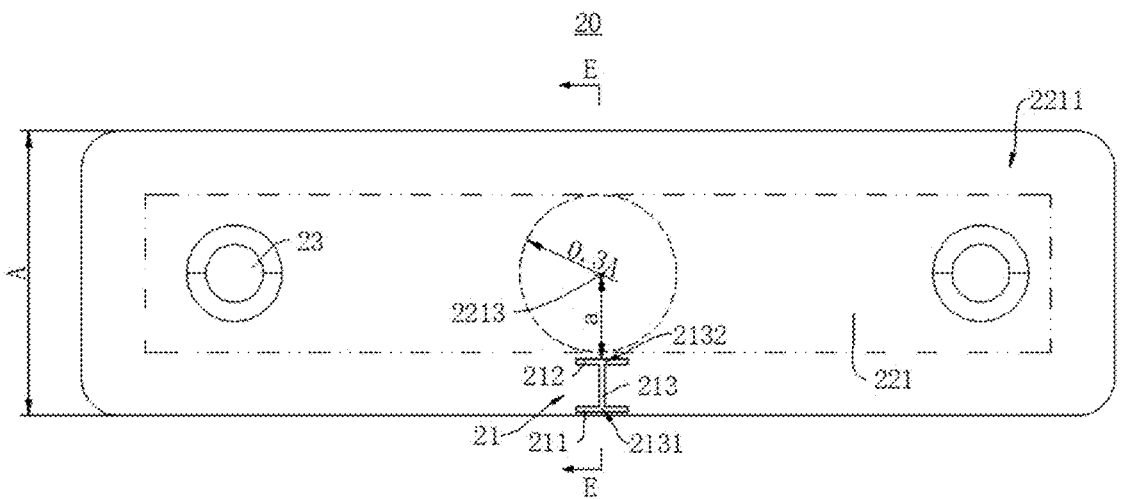
FIG. 9 is a schematic top view of a battery cell according to still some other embodiments of this application.
Figure 10:
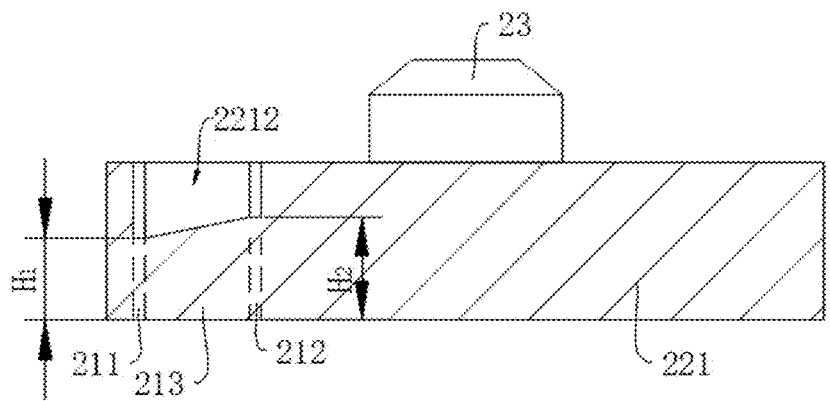
FIG. 10 is a cross-sectional view at position E-E in FIG. 9.

Referring to FIG. 9 and FIG. 10, FIG. 9 is a schematic top view of the battery cell 20 according to still some other embodiments of this application. FIG. 10 is a cross-sectional view at position E-E in FIG. 9. In some further embodiments, the wall portion 221 is provided with a score groove 2212, and the weakened portion 21 is formed at the bottom of the score groove 2212.

The score groove 2212 may be formed in various ways, such as stamping or milling. The score groove 2212 may be disposed on a surface of the wall portion 221 facing an interior of the casing 22, or may be disposed on a surface of the wall portion 221 facing away from the interior of the casing 22. Taking the wall portion 221 as a rectangular flat plate structure as an example, the wall portion 221 has an inner surface and an outer surface opposite each other in a thickness direction, the inner surface of the wall portion 221 faces the interior of the casing 22, the outer surface of the wall portion 221 is disposed facing away from the interior of the casing 22, and the score groove 2212 may be disposed on the inner surface of the wall portion 221 or may be disposed on the outer surface of the wall portion 221.

The score groove 2212 may be a groove recessed from the outer surface of the wall portion 221 along the thickness direction of the wall portion 221, and the weakened portion 21 is a portion of the wall portion 221 between the inner surface and a bottom surface of the score groove 2212. The score groove 2212 may also be a groove recessed from the inner surface of the wall portion 221 along the thickness direction of the wall portion 221, and the weakened portion 21 is a portion of the wall portion 221 between the outer surface and a bottom surface of the score groove 2212.

Taking the score groove 2212 as a groove recessed from the outer surface of the wall portion 221 along the thickness direction of the wall portion 221 as an example, the score groove 2212 may be a linear groove extending along a straight trajectory. The score groove 2212 may also be an annular groove extending along a closed trajectory.

Forming the weakened portion 21 by providing the score groove 2212 on the wall portion 221 is simple, convenient, and cost-effective.

Referring to FIG. 9 and FIG. 10, in some embodiments, the weakened portion 21 includes a first weakened segment 211 and a second weakened segment 212, the first weakened segment 211 is closer to the edge of the outer surface than the second weakened segment 212. A thickness of the first weakened segment 211 is less than a thickness of the second weakened segment 212.

The score groove 2212 may include a plurality of groove segments, and correspondingly, the weakened portion 21 includes a plurality of weakened segments, where the groove segments and the weakened segments may correspond one-to-one.

The plurality of weakened segments include the first weakened segment 211 and the second weakened segment 212, and the first weakened segment 211 may be opposite the second weakened segment 212 or may not be opposite the second weakened segment 212. The first weakened segment 211 and the second weakened segment 212 may be parallel to each other or non-parallel to each other.

"The first weakened segment 211 is closer to the edge of the outer surface than the second weakened segment 212" means that a maximum distance between the first weakened segment 211 and the edge of the outer surface is less than a minimum distance between the first weakened segment 211 and the edge of the outer surface.

The thickness of the first weakened segment 211 and the thickness of the second weakened segment 212 may be uniform; for example, thicknesses at different positions on the first weakened segment 211 are all equal, and in this case, a thickness at any position on the first weakened segment 211 may be taken as the thickness of the first weakened segment 211. Thicknesses at different positions on the second weakened segment 212 are all equal, and in this case, a thickness at any position on the second weakened segment 212 may be taken as the thickness of the second weakened segment 212, such that the thickness of the first weakened segment 211 is less than the thickness of the second weakened segment 212.

The thickness of the first weakened segment 211 and the thickness of the second weakened segment 212 may be non-uniform; for example, thicknesses at different positions on the first weakened segment 211 may vary, and thicknesses at different positions on the second weakened segment 212 may vary. In this case, a maximum thickness of the first weakened segment 211 is less than a minimum thickness of the second weakened segment 212.

Referring to FIG. 10, the thickness of the first weakened segment 211 may be $H_1$ in FIG. 10, the thickness of the second weakened segment 212 may be $H_2$ in FIG. 10, satisfying: $H_1 < H_2$.

During pressure relief of the battery cell 20, both the internal gas pressure of the battery cell 20 and deformation of the wall portion 221 affect the weakened portion 21, causing the weakened portion 21 to rupture. The greater the internal gas pressure of the battery cell 20, the more easily the weakened portion 21 is ruptured. The greater the deformation of the wall portion 221, the more easily the weakened portion 21 is ruptured. The first weakened segment 211 is closer to the edge of the outer surface than the second weakened segment 212, and since the internal gas pressure of the battery cell 20 is the same, a degree of deformation of the wall portion 221 at a position of the first weakened segment 211 is less than a degree of deformation of the wall portion 221 at a position of the second weakened segment 212; if the thickness of the first weakened segment 211 is the same as the thickness of the second weakened segment 212, the first weakened segment 211 is more difficult to rupture than the second weakened segment 212. By setting the thickness of the first weakened segment 211 to be less than the thickness of the second weakened segment 212, when the internal pressure of the battery cell 20 reaches the activation pressure, both the first weakened segment 211 and the second weakened segment 212 are easily ruptured, thereby facilitating pressure relief.

Referring to FIG. 9 and FIG. 10, in some embodiments, the weakened portion 21 includes a third weakened segment 213, the first weakened segment 211 and the second weakened segment 212 are opposite each other and spaced apart. The third weakened segment 213 connects the first weakened segment 211 and the second weakened segment 212.

The first weakened segment 211, the second weakened segment 212, and the third weakened segment 213 may each be a straight segment or a non-straight segment, such as a circular arc segment. In an embodiment where the first weakened segment 211, the second weakened segment 212, and the third weakened segment 213 are all straight segments, it can be understood that the first weakened segment 211, the second weakened segment 212, and the third weakened segment 213 all extend along a straight line, the first weakened segment 211 and the second weakened segment 212 may be parallel to each other or may be at an angle to each other. The first weakened segment 211 and the second weakened segment 212 may both be perpendicular to the third weakened segment 213, or may not be perpendicular to the third weakened segment 213.

A connection position between the first weakened segment 211 and the third weakened segment 213 may be located at an end of the first weakened segment 211, or may be located at a position offset from an end of the first weakened segment 211. For example, the connection position between the first weakened segment 211 and the third weakened segment 213 is located at a midpoint of the first weakened segment 211 in an extension direction. A connection position between the second weakened segment 212 and the third weakened segment 213 may be located at an end of the second weakened segment 212, or may be located at a position offset from an end of the second weakened segment 212. For example, the connection position between the second weakened segment 212 and the third weakened segment 213 is located at a midpoint of the second weakened segment 212 in an extension direction.

During pressure relief of the battery cell 20, the weakened portion 21 can open along the first weakened segment 211, the second weakened segment 212, and the third weakened segment 213, providing a larger pressure relief area, which helps to increase a pressure relief rate.

Referring to FIG. 9 and FIG. 10, in some embodiments, the third weakened segment 213 intersects the first weakened segment 211 at a first end 2131, and the third weakened segment 213 intersects the second weakened segment 212 at a second end 2132. Along an extension direction of the third weakened segment 213, a thickness of the third weakened segment 213 gradually increases from the first end 2131 toward the second end 2132.

The first end 2131 is an intersection position of the third weakened segment 213 and the first weakened segment 211. The first end 2131 may be an end of the third weakened segment 213 along the extension direction thereof. The first end 2131 may also not be an end of the third weakened segment 213 along the extension direction thereof, and in this case, the third weakened segment 213 extends beyond the first weakened segment 211 along the extension direction thereof.

The second end 2132 is an intersection position of the third weakened segment 213 and the second weakened segment 212. The second end 2132 may be an end of the third weakened segment 213 along the extension direction thereof. The second end 2132 may also not be an end of the third weakened segment 213 along the extension direction thereof, and in this case, the third weakened segment 213 extends beyond the second weakened segment 212 along the extension direction thereof.

Along the extension direction of the third weakened segment 213, the thickness of the third weakened segment 213 gradually increases from the first end 2131 toward the second end 2132, or in other words, the thickness of the third weakened segment 213 gradually decreases from the second end 2132 toward the first end 2131.

The first end 2131 is closer to the edge of the outer surface than the second end 2132, and since the internal gas pressure of the battery cell 20 is the same, a degree of deformation at a position on the third weakened segment 213 near the first end 2131 is less than a degree of deformation at a position on the third weakened segment 213 farther from the first end 2131; if the thicknesses at all positions on the third weakened segment 213 are the same, the position on the third weakened segment 213 near the first end 2131 is more difficult to rupture than the position on the third weakened segment 213 farther from the first end 2131. By having the thickness of the third weakened segment 213 gradually increase from the first end 2131 toward the second end 2132, when the internal pressure of the battery cell 20 reaches the activation pressure, all positions on the third weakened segment 213 are easily ruptured, thereby facilitating pressure relief.

Figure 11:
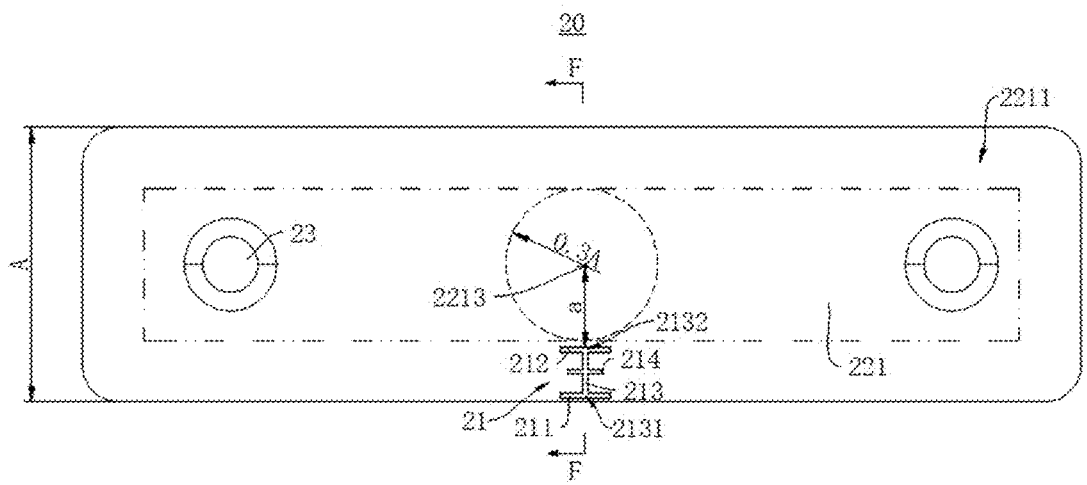
FIG. 11 is a schematic top view of a battery cell according to yet still some other embodiments of this application.
Figure 12:
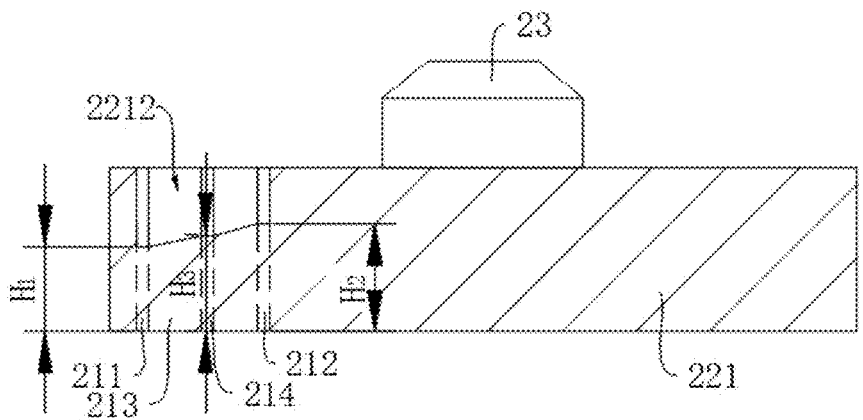
FIG. 12 is a cross-sectional view at position F-F in FIG. 11.

Referring to FIG. 11 and FIG. 12, FIG. 11 is a schematic top view of the battery cell 20 according to yet still some other of this application. FIG. 12 is a cross-sectional view at position F-F in FIG. 11. In some additional embodiments, the weakened portion 21 includes a fourth weakened segment 214, the fourth weakened segment 214 is located between the first weakened segment 211 and the second weakened segment 212 and intersects the third weakened segment 213. A thickness of the fourth weakened segment 214 is greater than the thickness of the first weakened segment 211, and the thickness of the fourth weakened segment 214 is less than the thickness of the second weakened segment 212.

The fourth weakened segment 214 may be a straight segment or a non-straight segment, such as a circular arc segment. In an embodiment where the first weakened segment 211, the second weakened segment 212, the third weakened segment 213, and the fourth weakened segment 214 are all straight segments, it can be understood that the first weakened segment 211, the second weakened segment 212, the third weakened segment 213, and the fourth weakened segment 214 all extend along a straight line, the first weakened segment 211 and the fourth weakened segment 214 may be parallel to each other or may be at an angle. The second weakened segment 212 and the fourth weakened segment 214 may be parallel to each other or may be at an angle. The third weakened segment 213 may be perpendicular to the fourth weakened segment 214 or may not be perpendicular to the fourth weakened segment 214.

A connection position between the third weakened segment 213 and the fourth weakened segment 214 may be located at an end of the fourth weakened segment 214, or may be located at a position offset from an end of the fourth weakened segment 214; for example, the connection position between the third weakened segment 213 and the fourth weakened segment 214 is located at a midpoint of the fourth weakened segment 214 in an extension direction.

The first weakened segment 211 is closer to the edge of the outer surface than the fourth weakened segment 214, and the fourth weakened segment 214 is closer to the edge of the outer surface than the second weakened segment 212.

The thickness of the fourth weakened segment 214 may be uniform; for example, thicknesses at different positions on the fourth weakened segment 214 are all equal, and in this case, a thickness at any position on the fourth weakened segment 214 may be taken as the thickness of the fourth weakened segment 214, such that the thickness of the fourth weakened segment 214 is greater than a maximum thickness of the first weakened segment 211, and the thickness of the fourth weakened segment 214 is less than a minimum thickness of the second weakened segment 212.

The thickness of the fourth weakened segment 214 may be non-uniform; for example, thicknesses at different positions on the fourth weakened segment 214 may vary. In this case, a minimum thickness of the fourth weakened segment 214 is greater than a maximum thickness of the first weakened segment 211, and a maximum thickness of the fourth weakened segment 214 is less than a minimum thickness of the second weakened segment 212.

Referring to FIG. 12, the thickness of the first weakened segment 211 may be $H_1$ in FIG. 12, the thickness of the second weakened segment 212 may be $H_2$ in FIG. 12, and the thickness of the fourth weakened segment 214 may be $H_3$ in FIG. 12, satisfying: $H_1<H_3<H_2$.

The first weakened segment 211 is closer to the edge of the outer surface than the fourth weakened segment 214, and since the internal gas pressure of the battery cell 20 is the same, a degree of deformation of the wall portion 221 at a position of the first weakened segment 211 is less than a degree of deformation of the wall portion 221 at a position of the fourth weakened segment 214; if the thickness of the first weakened segment 211 is the same as the thickness of the fourth weakened segment 214, the first weakened segment 211 is more difficult to rupture than the fourth weakened segment 214. By setting the thickness of the first weakened segment 211 to be less than the thickness of the fourth weakened segment 214, when the internal pressure of the battery cell 20 reaches the activation pressure, both the first weakened segment 211 and the fourth weakened segment 214 are easily ruptured, thereby facilitating pressure relief. The fourth weakened segment 214 is closer to the edge of the outer surface than the second weakened segment 212, and since the internal gas pressure of the battery cell 20 is the same, a degree of deformation of the wall portion 221 at a position of the fourth weakened segment 214 is less than a degree of deformation of the wall portion 221 at a position of the second weakened segment 212; if the thickness of the fourth weakened segment 214 is the same as the thickness of the second weakened segment 212, the fourth weakened segment 214 is more difficult to rupture than the second weakened segment 212. By setting the thickness of the fourth weakened segment 214 to be less than the thickness of the second weakened segment 212, when the internal pressure of the battery cell 20 reaches the activation pressure, both the fourth weakened segment 214 and the second weakened segment 212 are easily ruptured, thereby facilitating pressure relief.

Figure 13:
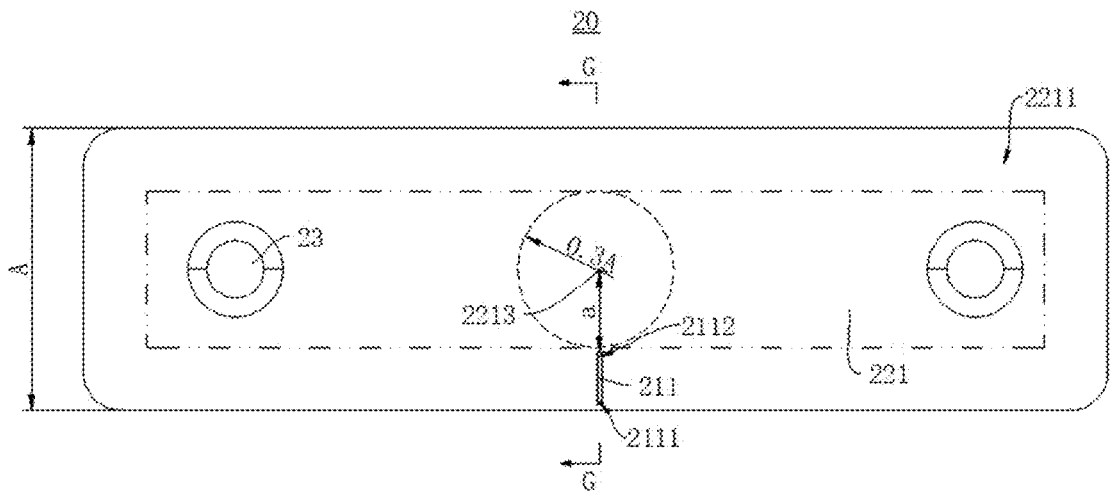
FIG. 13 is a schematic top view of a battery cell according to further some embodiments of this application.
Figure 14:
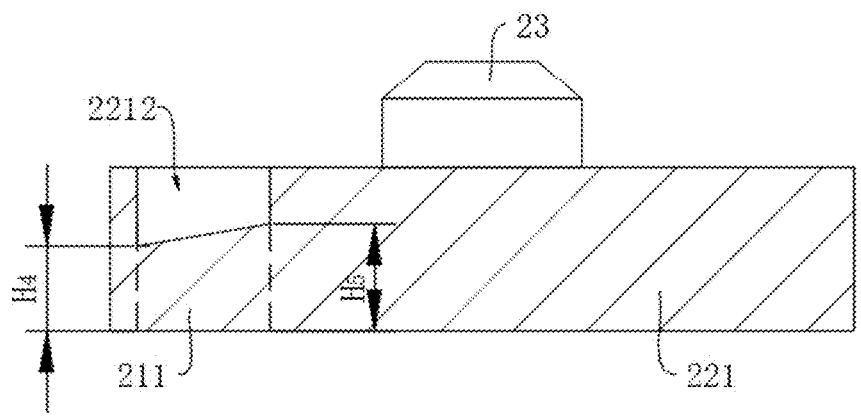
FIG. 14 is a cross-sectional view at position G-G in FIG. 13.

Referring to FIG. 13 and FIG. 14, FIG. 13 is a schematic top view of the battery cell 20 according to some other additional embodiments of this application. FIG. 14 is a cross-sectional view at position G-G in FIG. 13. In some other additional embodiments, the weakened portion 21 includes a first weakened segment 211, the first weakened segment 211 includes a third end 2111 and a fourth end 2112 opposite each other, and the third end 2111 is closer to the edge of the outer surface than the fourth end 2112. A thickness of the third end 2111 is less than a thickness of the fourth end 2112.

The third end 2111 and the fourth end 2112 are two ends of the first weakened segment 211 along an extension direction thereof, respectively. A distance from the third end 2111 to the edge of the outer surface is less than a distance from the fourth end 2112 to the edge of the outer surface, that is, the third end 2111 is closer to the edge of the outer surface than the fourth end 2112.

Referring to FIG. 14, the thickness of the third end 2111 may be $H_4$ in FIG. 14, and the thickness of the fourth end 2112 may be $H_5$ in FIG. 14, satisfying: $H_4<H_5$. The third end 2111 is closer to the edge of the outer surface than the fourth end 2112, and since the internal gas pressure of the battery cell 20 is the same, a degree of deformation of the wall portion 221 at a position of the third end 2111 is less than a degree of deformation of the wall portion 221 at a position of the fourth end 2112; if the thickness of the third end 2111 is the same as the thickness of the fourth end 2112, the third end 2111 is more difficult to rupture than the fourth end 2112. By setting the thickness of the third end 2111 to be less than the thickness of the fourth end 2112, when the internal pressure of the battery cell 20 reaches the activation pressure, both the third end 2111 and the fourth end 2112 are easily ruptured, thereby facilitating pressure relief.

Referring to FIG. 13 and FIG. 14, in some embodiments, along an extension direction of the first weakened segment 211, the thickness of the first weakened segment 211 gradually increases from the third end 2111 toward the fourth end 2112.

The first weakened segment 211 may be a straight segment. In the extension direction of the first weakened segment 211, the first weakened segment 211 gradually approaches the center point 2213 in the direction from the third end 2111 to the fourth end 2112. Correspondingly, the thickness of the first weakened segment 211 gradually increases in the direction from the third end 2111 to the fourth end 2112.

The third end 2111 is closer to the edge of the outer surface than the fourth end 2112, and since the internal gas pressure of the battery cell 20 is the same, a degree of deformation at a position on the first weakened segment 211 near the third end 2111 is less than a degree of deformation at a position on the first weakened segment 211 near the fourth end 2112; if the thicknesses at all positions on the first weakened segment 211 are the same, the position on the first weakened segment 211 near the third end 2111 is more difficult to rupture than the position on the first weakened segment 211 near the fourth end 2112. By having the thickness of the first weakened segment 211 gradually increase from the third end 2111 toward the fourth end 2112, when the internal pressure of the battery cell 20 reaches the activation pressure, all positions on the first weakened segment 211 are easily ruptured, thereby facilitating pressure relief.

In some embodiments, the weakened portion 21 includes an arbitrary first weakened point and an arbitrary second weakened point, the first weakened point is closer to the edge of the outer surface than the second weakened point, and a thickness of the weakened portion 21 at the first weakened point is less than a thickness of the weakened portion 21 at the second weakened point.

The first weakened point and the second weakened point are any two points on the weakened portion 21. For example, the first weakened point may be a position corresponding to the third end 2111 of the first weakened segment 211, and the second weakened point may be a position corresponding to the fourth end 2112 of the first weakened segment 211. As another example, the first weakened point may be a position corresponding to the third end 2111 of the first weakened segment 211, and the second weakened point may be a midpoint position of the first weakened segment 211.

The distance from the first weakened point to the edge of the outer surface is less than the distance from the second weakened point to the edge of the outer surface, that is, the first weakened point is closer to the edge of the outer surface than the second weakened point. Correspondingly, the thickness of the weakened portion 21 at the first weakened point is less than the thickness of the weakened portion 21 at the second weakened point.

The first weakened point is closer to the edge of the outer surface than the second weakened point, and since the internal gas pressure of the battery cell 20 is the same, a degree of deformation of the wall portion 221 at a position of the first weakened point is less than a degree of deformation of the wall portion 221 at a position of the second weakened point; if the thickness at the first weakened point is the same as the thickness at the second weakened point, the first weakened point is more difficult to rupture than the second weakened point. By setting the thickness of the first weakened point to be less than the thickness of the second weakened point, when the internal pressure of the battery cell 20 reaches the activation pressure, both the first weakened point and the second weakened point are easily ruptured, thereby facilitating pressure relief.

Figure 15:
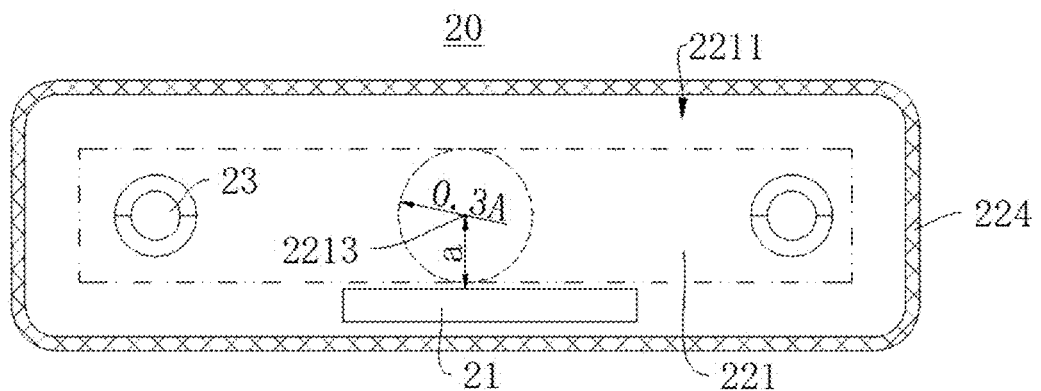
FIG. 15 is a schematic top view of a battery cell according to still further some embodiments of this application.

Referring to FIG. 15, FIG. 15 is a schematic top view of the battery cell 20 according to still further some embodiments of this application. In some embodiments, the casing 22 includes a shell 222 and an end cap 223, the shell 222 has an opening, the end cap 223 closes the opening, and the end cap 223 and the shell 222 are welded to form a weld mark portion 224; and along a thickness direction of the wall portion 221, a projection of the weakened portion 21 does not overlap with a projection of the weld mark portion 224.

The end cap 223 and the shell 222 may be welded together by laser welding or other welding methods, and after welding, the weld mark portion 224 is formed at a joint between the end cap 223 and the shell 222.

The wall portion 221 may be the end cap 223, and in this case, the weld mark portion 224 is located at an edge position of the end cap 223. Along the thickness direction of the wall portion 221, the projection of the weakened portion 21 does not overlap with the projection of the weld mark portion 224, meaning that the weakened portion 21 is offset from the weld mark portion 224.

A position of the weld mark portion 224 is relatively weak, and the weakened portion 21 is offset from the weld mark portion 224, such that the weakened portion 21 and the weld mark portion 224 do not interfere with each other. The weakened portion 21 is less likely to affect the strength of the weld mark portion 224, enabling stable connection between the end cap 223 and the shell 222.

In some embodiments, the wall portion 221 includes a body portion, and the weakened portion 21 is integrally formed with the body portion.

Integrally forming means that the weakened portion 21 and the body portion are provided as a single structure. For example, the weakened portion 21 may be formed on the wall portion 221 by methods such as stamping or cold heading.

Integrally forming the weakened portion 21 with the body portion can enhance the rigidity of the weakened portion 21, thereby improving the resistance of the weakened portion 21 to creep and impact from electrolyte, which helps to increase the lifespan of the weakened portion 21 and reduce the risk of leakage at the weakened portion 21.

In some embodiments, the hardness of the weakened portion 21 is greater than the hardness of the body portion.

The weakened portion 21 may be formed by stamping, such that the weakened portion 21 undergoes cold work hardening (the grain arrangement changes, leading to lattice distortion and deformation, reducing the plasticity of the metal and increasing the material hardness). The hardness of the weakened portion 21 becomes greater than the hardness of the body portion, enhancing its ability to resist external impacts and making it less susceptible to damage from external impact forces. Additionally, the fatigue resistance of the weakened portion 21 is improved, making it less prone to fatigue failure.

In some other embodiments, the wall portion 221 includes a body portion and a pressure relief mechanism, the pressure relief mechanism and the body portion are separately arranged and connected. The weakened portion 21 is disposed on the pressure relief mechanism, and an outer surface of the body portion is the outer surface of the wall portion 221.

"The pressure relief mechanism and the body portion are separately arranged and connected" means that during manufacturing, the pressure relief mechanism and the body portion are provided separately and ultimately connected together. For example, the pressure relief mechanism may be welded to the body portion. In this case, the pressure relief mechanism may protrude from the outer surface of the body portion, and at this time, the outer surface of the body portion is taken as the outer surface of the wall portion 221.

By separately arranging the pressure relief mechanism and the body portion and installing the pressure relief mechanism on the body portion, manufacturing is facilitated.

Figure 16:
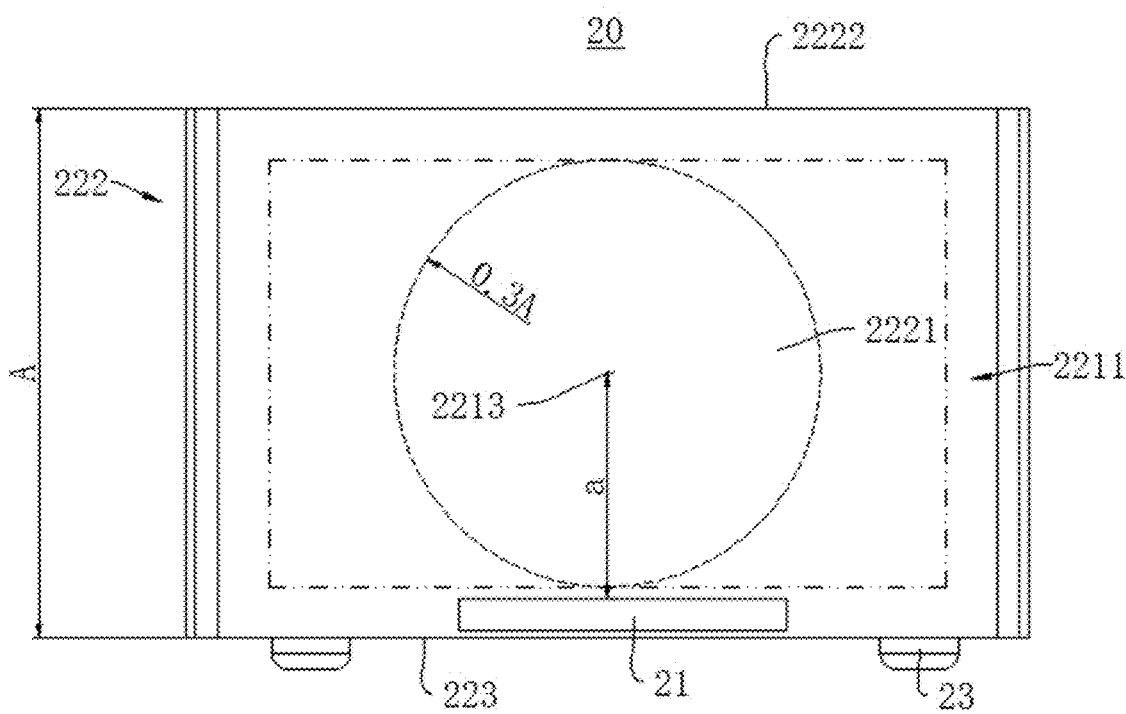
FIG. 16 is a schematic structural diagram of a battery cell according to yet still further some embodiments of this application.
Figure 17:
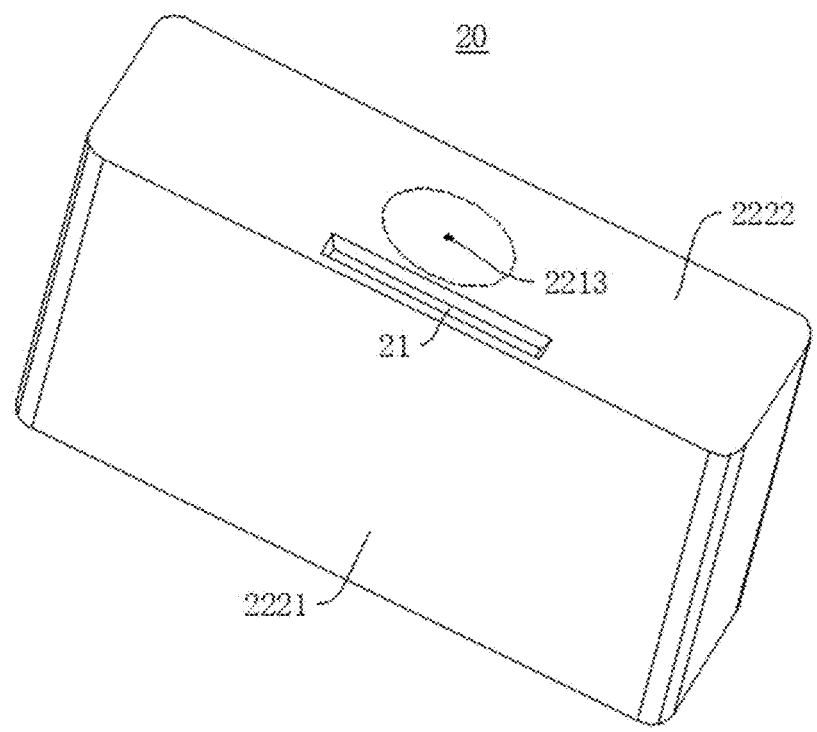
FIG. 17 is a schematic structural diagram of a battery cell according to some additional embodiments of this application.

Referring to FIG. 15, FIG. 16, and FIG. 17, FIG. 16 is a schematic structural diagram of the battery cell 20 according to yet still further some embodiments of this application. FIG. 17 is a schematic structural diagram of the battery cell 20 according to some additional embodiments of this application. In some embodiments, the casing 22 includes a shell 222 and an end cap 223, the shell 222 has an opening, the end cap 223 closes the opening and is fixed to the shell 222. The wall portion 221 is the end cap 223 or a wall of the shell 222.

Referring to FIG. 15, in the embodiment shown in FIG. 15, the end cap 223 is the wall portion 221.

Referring to FIG. 16, in the embodiments shown in FIG. 16, the shell 222 includes a side wall 2221 and a bottom wall 2222 that are integrally formed. The side wall 2221 is disposed around the periphery of the bottom wall 2222, and along the thickness direction of the bottom wall 2222, one end of the side wall 2221 is connected to the bottom wall 2222, while the other end encloses to form an opening. The end cap 223 closes the opening. Here, the side wall 2221 is the wall portion 221.

During providing of the shell 222, the side wall 2221 and the bottom wall 2222 are a single structure. The side wall 2221 and the bottom wall 2222 may be integrally formed by stamping or by casting. One end of the side wall 2221 is connected to the bottom wall 2222, and the other end of the side wall 2221 is connected to the end cap 223. Along the thickness direction of the end cap 223, the bottom wall 2222 and the end cap 223 are opposite each other.

Referring to FIG. 17, in the embodiments shown in FIG. 17, the casing 22 includes a shell 222 and an end cap 223, and the shell 222 includes a side wall 2221 and a bottom wall 2222 that are integrally formed. The side wall 2221 is disposed around the periphery of the bottom wall 2222, and along the thickness direction of the bottom wall 2222, one end of the side wall 2221 is connected to the bottom wall 2222, while the other end encloses to form an opening. The end cap 223 closes the opening. The bottom wall 2222 is the wall portion 221.

The thickness of the bottom wall 2222 is typically greater, but it is also more susceptible to external impacts. Therefore, by disposing the weakened portion 21 in the first region 2211 of the bottom wall 2222, the thickness of the weakened portion 21 can be increased, such that during normal use of the battery cell 20, the weakened portion 21 has a stronger ability to resist external impacts, which helps to reduce the risk of the weakened portion 21 opening prematurely.

The wall portion 221 may be the end cap 223, the bottom wall 2222 of the shell 222, or the side wall 2221 of the shell 222. Disposing weakened portion 21 at the position near the edge of the end cap 223, the bottom wall 2222, or the side wall 2221 makes it less prone to fatigue failure under gas pressure, which helps to reduce the risk of the weakened portion 21 opening prematurely, enabling the battery cell 20 to operate normally.

An embodiment of this application further provides a battery 100, where the battery 100 includes the above-described battery cell 20.

An embodiment of this application further provides an electric device, where the electric device includes the above-described battery cell 20.

According to some embodiments of this application, refer to FIG. 3 to FIG. 17.

An embodiment of this application provides a battery cell 20, where the battery cell 20 includes a casing 22, and the casing 22 has a wall portion 221. The wall portion 221 includes a weakened portion 21, the weakened portion 21 is configured to be ruptured when the battery cell 20 releases internal pressure, and an outer surface of the wall portion 221 has a center point 2213. A minimum distance between a projection of the weakened portion 21 on an outer surface of the wall portion 221 and the center point 2213 is denoted as a, a minimum radial dimension of the outer surface of the wall portion 221 is denoted as A, and the two satisfy: a≥0.3A. The radial direction refers to a direction passing through the center point 2213. The minimum distance between the projection of the weakened portion 21 on the outer surface of the wall portion 221 and the center point 2213 is greater than or equal to 0.3 times the minimum radial dimension of the outer surface of the wall portion 221, such that the weakened portion 21 is farther from the center point 2213 and closer to the edge of the wall portion 221. A position on the wall portion 221 near the edge thereof, compared to a position near the center thereof, has greater rigidity, stronger resistance to deformation, and stronger fatigue resistance. Disposing the weakened portion 21 at the position near the edge of the wall portion 221 makes it less prone to fatigue failure under gas pressure, which helps to reduce the risk of the weakened portion 21 opening prematurely, enabling the battery cell 20 to operate normally.

The wall portion 221 includes a first region 2211, the first region 2211 being a region within a preset distance b from an edge of the outer surface, and the weakened portion 21 is disposed in the first region 2211, satisfying: b=0.2A. The first region 2211 is a region on the wall portion 221 with relatively greater rigidity, offering stronger resistance to deformation and stronger fatigue resistance. Positioning the weakened portion 21 in the first region 2211 makes the weakened portion 21 less prone to fatigue failure under gas pressure, which helps to reduce the risk of the weakened portion 21 opening prematurely, enabling the battery cell 20 to operate normally.

The wall portion 221 is provided with a score groove 2212, and the weakened portion 21 is formed at the bottom of the score groove 2212. The weakened portion 21 includes a first weakened segment 211 and a second weakened segment 212, the first weakened segment 211 is closer to the edge of the outer surface than the second weakened segment 212, and a thickness of the first weakened segment 211 is less than a thickness of the second weakened segment 212. Forming the weakened portion 21 by providing the score groove 2212 on the wall portion 221 is simple, convenient, and cost-effective. During pressure relief of the battery cell 20, both the internal gas pressure of the battery cell 20 and deformation of the wall portion 221 affect the weakened portion 21, causing the weakened portion 21 to rupture. The greater the internal gas pressure of the battery cell 20, the more easily the weakened portion 21 is ruptured. The greater the deformation of the wall portion 221, the more easily the weakened portion 21 is ruptured. The first weakened segment 211 is closer to the edge of the outer surface than the second weakened segment 212, and since the internal gas pressure of the battery cell 20 is the same, a degree of deformation of the wall portion 221 at the position of the first weakened segment 211 is less than a degree of deformation of the wall portion 221 at the position of the second weakened segment 212; if the thickness of the first weakened segment 211 is the same as the thickness of the second weakened segment 212, the first weakened segment 211 is more difficult to rupture than the second weakened segment 212. By setting the thickness of the first weakened segment 211 to be less than the thickness of the second weakened segment 212, when the internal pressure of the battery cell 20 reaches the activation pressure, both the first weakened segment 211 and the second weakened segment 212 are easily ruptured, thereby facilitating pressure relief.

The foregoing descriptions are merely preferred embodiments of this application and are not intended to limit this application. For those skilled in the art, this application may have various modifications and variations. Any modification, equivalent replacement, and improvement made without departing from the spirit and principle of this application shall fall within the protection scope of this application.

What is claimed is:
1. A battery cell, comprising:
 a casing having a wall portion, the wall portion comprising a weakened portion, the weakened portion being configured to be ruptured when the battery cell releases internal pressure, and an outer surface of the wall portion having a center point; and
 a minimum distance between a projection of the weakened portion on an outer surface of the wall portion and the center point is denoted as a, a minimum radial dimension of the outer surface of the wall portion is denoted as A, and the two satisfy: a≥0.3A, wherein the radial direction refers to a direction passing through the center point,
 wherein the wall portion comprises a first region, the first region being a region within a preset distance b from an edge of the outer surface, and the weakened portion is disposed in the first region, satisfying: b=0.2A,
 the weakened portion comprises a first weakened segment and a second weakened segment, the first weakened segment is closer to the edge of the outer surface than the second weakened segment, and a thickness of the first weakened segment is less than a thickness of the second weakened segment.

2. The battery cell according to claim 1, wherein the outer surface of the wall portion is square, the first region comprises a long-side region, a short-side region, and a corner region, the long-side region extends along a length direction of the wall portion, the short-side region extends along a width direction of the wall portion, the corner region connects the long-side region and the short-side region, and the weakened portion is disposed in the corner region.

3. The battery cell according to claim 1, wherein the wall portion is provided with a score groove, and the weakened portion is formed at the bottom of the score groove.

4. The battery cell according to claim 1, wherein the weakened portion comprises a third weakened segment, the first weakened segment and the second weakened segment are opposite each other and spaced apart, and the third weakened segment connects the first weakened segment and the second weakened segment.

5. The battery cell according to claim 4, wherein the third weakened segment intersects the first weakened segment at a first end, the third weakened segment intersects the second weakened segment at a second end, and along an extension direction of the third weakened segment, a thickness of the third weakened segment gradually increases from the first end toward the second end.

6. The battery cell according to claim 4, wherein the weakened portion comprises a fourth weakened segment, the fourth weakened segment is located between the first weakened segment and the second weakened segment and intersects the third weakened segment, a thickness of the fourth weakened segment is greater than the thickness of the first weakened segment, and the thickness of the fourth weakened segment is less than the thickness of the second weakened segment.

7. The battery cell according to claim 1, wherein the weakened portion comprises a first weakened segment, the first weakened segment comprises a third end and a fourth end opposite each other, the third end is closer to the edge of the outer surface than the fourth end, and a thickness of the third end is less than a thickness of the fourth end.

8. The battery cell according to claim 7, wherein along an extension direction of the first weakened segment, the thickness of the first weakened segment gradually increases from the third end toward the fourth end.

9. The battery cell according to claim 1, wherein the weakened portion comprises an arbitrary first weakened point and an arbitrary second weakened point, the first weakened point is closer to the edge of the outer surface than the second weakened point, and a thickness of the weakened portion at the first weakened point is less than a thickness of the weakened portion at the second weakened point.

10. The battery cell according to claim 1, wherein the casing comprises a shell and an end cap, the shell has an opening, the end cap closes the opening, and the end cap and the shell are welded to form a weld mark portion; and
    along a thickness direction of the wall portion, a projection of the weakened portion does not overlap with a projection of the weld mark portion.

11. The battery cell according to claim 1, wherein the wall portion comprises a body portion, and the weakened portion is integrally formed with the body portion.

12. The battery cell according to claim 1, wherein the wall portion comprises a body portion and a pressure relief mechanism, the pressure relief mechanism and the body portion are separately arranged and connected, the weakened portion is disposed on the pressure relief mechanism, and an outer surface of the body portion is the outer surface of the wall portion.

13. The battery cell according to claim 1, wherein the casing comprises:
    a shell having an opening; and
    an end cap closing the opening; wherein
    the wall portion is the end cap or a wall of the shell.

14. A battery, comprising the battery cell according to claim 1.

15. An electric device, comprising the battery cell according to claim 1.

* * * * *